United States Patent [19]
Horiuchi et al.

[11] Patent Number: 5,956,466
[45] Date of Patent: Sep. 21, 1999

[54] IMAGE PROCESSOR CAPABLE OF OPERATION AS A FACSIMILE

[75] Inventors: Masanobu Horiuchi, Yokohama; Yoshinori Takagishi, Toyko; Naohiko Takemoto, Kawasaki, all of Japan

[73] Assignee: Canon Kabushiki Kaisha, Tokyo, Japan

[21] Appl. No.: 08/215,398

[22] Filed: Mar. 21, 1994

Related U.S. Application Data

[63] Continuation of application No. 07/861,032, Mar. 31, 1992, abandoned.

[30] Foreign Application Priority Data

Apr. 1, 1991 [JP] Japan .................................. 3-068577
Apr. 1, 1991 [JP] Japan .................................. 3-068579

[51] Int. Cl.⁶ ................................ H04N 1/32; H04N 1/46
[52] U.S. Cl. ....................... 395/109; 395/114; 358/434; 358/468; 358/501
[58] Field of Search ..................................... 358/442, 468, 358/401, 444, 296, 434, 501, 530; 355/202; 395/109, 114; 399/1, 82, 85

[56] References Cited

U.S. PATENT DOCUMENTS

| | | |
|---|---|---|
| 4,709,149 | 11/1987 | Takahashi et al. . |
| 4,739,397 | 4/1988 | Hayashi .................................. 358/501 |
| 4,821,107 | 4/1989 | Naito et al. . |
| 4,878,130 | 10/1989 | Shimizu et al. ......................... 358/400 |
| 4,905,098 | 2/1990 | Sakata .................................... 358/468 |
| 4,964,154 | 10/1990 | Shimotono ............................. 358/442 |
| 4,992,884 | 2/1991 | Sakata .................................... 358/468 |
| 5,016,114 | 5/1991 | Sakata .................................... 358/404 |
| 5,021,892 | 6/1991 | Kita et al. ............................... 358/468 |
| 5,027,214 | 6/1991 | Fujimori . |
| 5,109,434 | 4/1992 | Shimizu et al. .......................... 382/41 |
| 5,142,568 | 8/1992 | Ogata ..................................... 358/442 |
| 5,235,674 | 8/1993 | Cohen-Skalli et al. ................. 358/442 |
| 5,280,585 | 1/1994 | Kochis et al. ........................... 358/442 |

*Primary Examiner*—Scott Rogers
*Attorney, Agent, or Firm*—Fitzpatrick, Cella, Harper & Scinto

[57] ABSTRACT

An image processing system preferably for color processing, is constituted by an image memory device having an image memory (42), and a reader and a printer which are connected to the image memory device, and also has an electronic apparatus (20) which outputs commands for operating the processing system as a facsimile apparatus through a reader/printer interface (41) of the image memory device, and has an image compression unit (22) and a communication unit (30).

15 Claims, 33 Drawing Sheets

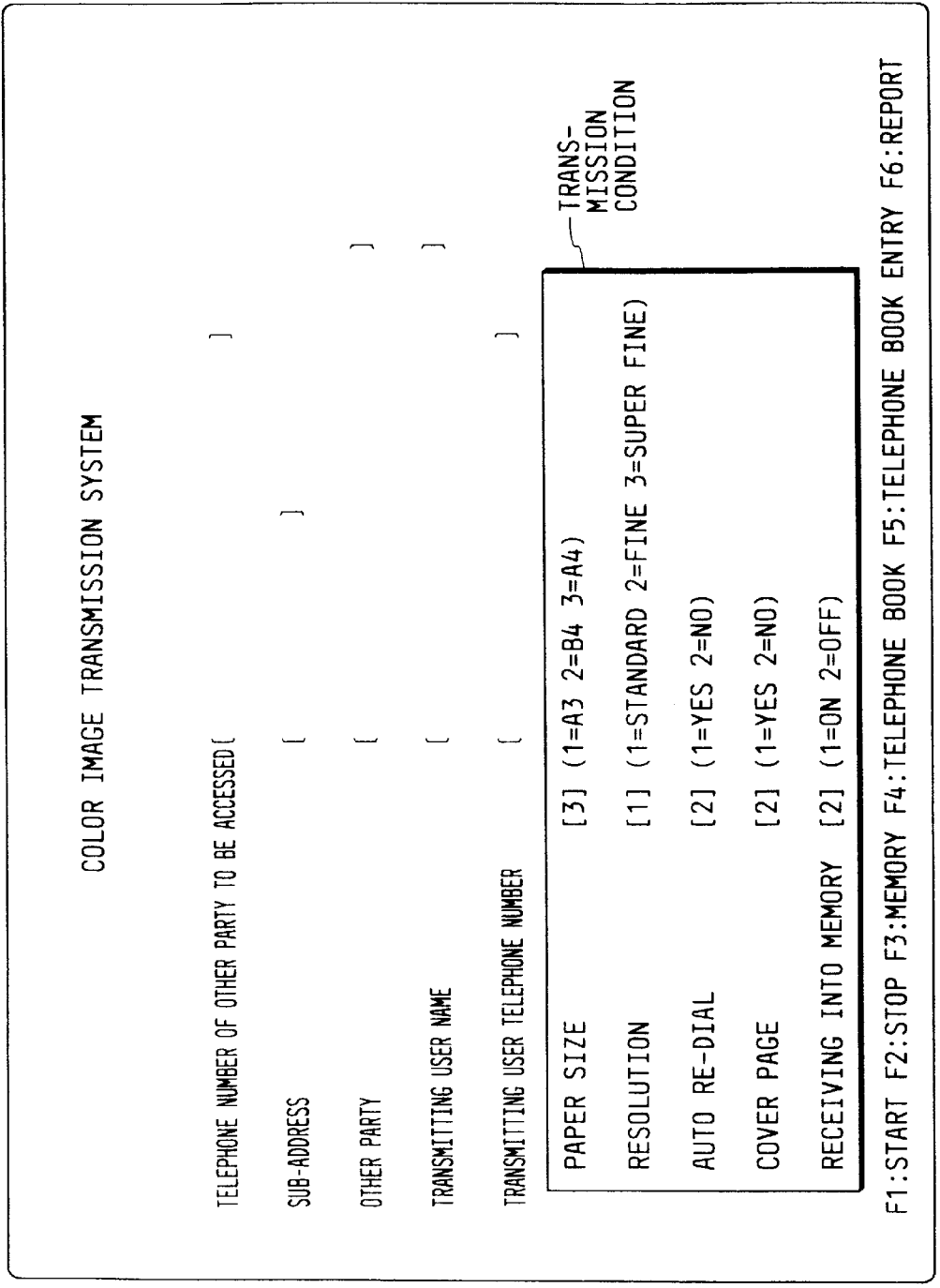

FIG. 22

COLOR IMAGE TRANSMISSION SYSTEM

| | NAME | TELEPHONE NUMBER | SUB-ADDRESS |
|---|---|---|---|
| 1 | ○○ OFFICE | 123-5689 | 000008 |
| 2 | AMI FACTORY | 03-3668-565 | 00002 |
| 3 | ×× OFFICE | 236-8995 | 000004 |
| 4 | ○○○ TECK | 4555-26566 | 000006 |
| 5 | ○○ OFFICE | 1256-56892 | 0005 |
| 6 | △△ SALES NAGOYA BRANCH | 256632-55 | 000004 |
| 7 | △△△ | 32366-56566 | 002234 |
| 8 | ○△ HEAD QUARTERS | 56556-98955 | 000035 |
| 9 | SENDAI OFFICE | 5656-78212 | 000001 |
| 10 | NISHI NIPPON OFFICE | 455-5668 | 122000 |

| | | |
|---|---|---|
| PAPER SIZE | [3] | (1=A3 2=B4 3=A4) |
| RESOLUTION | [1] | (1=STANDARD 2=FINE 3=SUPER FINE) |
| AUTO RE-DIAL | [2] | (1=YES 2=NO) |
| COVER PAGE | [2] | (1=YES 2=NO) |
| RECEIVING INTO MEMORY | [2] | (1=ON 2=OFF) |
| COLOR TRANSMISSION | [1] | (1=COLOR TRANSMISSION 2=MONOCHROMATIC TRANSMISSION) |

F1:START F2:STOP F3:MEMORY F4:SIMULTANEOUS TRANSMISSION F5:RELEASE SIMULTANEOUS TRANSMISSION F6:REPORT

TELEPHONE BOOK IMAGE

FIG. 23

COLOR IMAGE TRANSMISSION SYSTEM

| | NAME | TELEPHONE NUMBER | SUB-ADDRESS |
|---|---|---|---|
| 1 | ○○ OFFICE | 123-5689 | 000008 |
| 2 | AMI FACTORY | 03-3668-565 | 00002 |
| 3 | ×× OFFICE | 236-8995 | 000004 |
| 4 | ○○○ TECK | 4555-26566 | 000006 |
| 5 | ○○ OFFICE | 1256-56892 | 0005 |
| 6 | △△ SALES NAGOYA BRANCH | 256632-55 | 000004 |
| 7 | △△△ | 32366-56566 | 002234 |
| 8 | ○△ HEAD QUARTERS | 56556-98955 | 000035 |
| 9 | SENDAI OFFICE | 5656-78212 | 000001 |
| 10 | NISHI NIPPON OFFICE | 455-5668 | 122000 |

PAPER SIZE          [3]  (1=A3 2=B4 3=A4)
RESOLUTION          [1]  (1=STANDARD 2=FINE 3=SUPER FINE)
AUTO RE-DIAL        [2]  (1=YES 2=NO)
COVER PAGE          [2]  (1=YES 2=NO)
RECEIVING INTO MEMORY [2] (1=ON 2=OFF)

F1:START F2:STOP F3:MEMORY F4:SET SIMULTANEOUS TRANSMISSION F5:SIMULTANEOUS TRANSMISSION F6:REPORT

FIG. 24

| PAPER SIZE | [3] | (1=A3 2=B4 3=A4) |
|---|---|---|
| RESOLUTION | [1] | (1=STANDARD 2=FINE 3=SUPER FINE) |
| AUTO RE-DIAL | [2] | (1=YES 2=NO) |
| COVER PAGE | [2] | (1=YES 2=NO) |
| RECEIVING INTO MEMORY | [2] | (1=ON 2=OFF) |

CONDITION SETTING DIALOGUE

FIG. 25

* MEMORY DOCUMENT *

| TRANSMITTER NAME | RECEIVING DATE | RESOLUTION | PAPER |
|---|---|---|---|
| APPLE COMPUTER | 1990-03-15 14:24 | FINE | B4 |
| CANON SALES | 1991-03-15 15:50 | SUPER FINE | B4 |
| SCANNING | 1991-04-05 08:10 | STANDARD | A3 |
| KAMATA OFFICE | 1991-04-23 12:46 | FINE | A4 |

DOCUMENT READ

F1:TRANSFER F2:STOP F3:SCAN F4:PRINT F5:ERASE F6:REPORT

FIG. 26

```
PIXEL DiO OR IPU IS NOT AVAILABLE FOR RECEIVING.
RECEIVING INTO MEMORY IS TO BE EXECUTED ?

0 : YES
     1 : NO
```

FIG. 27

```
A4 SIZED CASSETTE IS NOT AVAILABLE TO RECEIVING
PIXEL DiO.
SELECT FOLLOWING OPTIONS.
     0. EXECUTE REDUCTION TRANSMISSION
     1. EXECUTE RECEIVING INTO MEMORY
     2. STOP TRANSMISSION
```

FIG. 28

```
** TRANSMISSION CONTINUES **
OTHER PARTY : SHIBUYA OFFICE
TELEPHONE NUMBER : xx-xxxx-xxxx

```
** MEMORY TRANSMISSION CONTINUES **
OTHER PARTY : SHIBUYA OFFICE
TELEPHONE NUMBER : xx-xxxx-xxxx

COLOR IMAGE TRANSMISSION SYSTEM

| | NAME | TELEPHONE NUMBER | SUB-ADDRESS |
|---|---|---|---|
| 1 | ○○ OFFICE | 123-5689 | 000008 |
| 2 | AMI F | | 00002 |
| 3 | ×× ○ | | 000004 |
| 4 | ○○ | | 000006 |
| 5 | ○○ | | 0005 |
| 6 | △△ | | 000004 |
| 7 | △△ | 56556-98955 | 002234 |
| 8 | ○△ HEAD QUARTERS | 5656-78212 | 000035 |
| 9 | SENDAI OFFICE | 455-5668 | 000001 |
| 10 | NISHI NIPPON OFFICE | | 122000 |

* TRANSMISSION CONTINUES *

OTHER PARTY : AMI FACTORY
TELEPHONE NUMBER : 0336-98566

PAPER SIZE [3] (1=A3 2=B4 3=A4)
RESOLUTION [1] (1=STANDARD 2=FINE 3=SUPER FINE)
AUTO RE-DIAL [2] (1=YES 2=NO)
COVER PAGE [2] (1=YES 2=NO)
RECEIVING INTO MEMORY [2] (1=ON 2=OFF)

F1:START F2:STOP F3:MEMORY F4:SET SIMULTANEOUS TRANSMISSION F5:SIMULTANEOUS TRANSMISSION F6:REPORT (COORDINATE SYSTEM OF IMAGE MEMORY 3)

FIG. 32

TRANSMISSION MAINTENANCE REPORT

| TRANSMISSION MODE | OTHER PARTY TELEPHONE NUMBER | OTHER PARTY | TIME | RESULT |
|---|---|---|---|---|
| AUTO RECEIVING | 1232-56623 | OFFICE | 03/12 11:45 | OK |
| AUTO RECEIVING | 23235-566648 | AMI FACTORY | 03/12 12:01 | OK |
| TRANSMISSION | 56565665 | | 03/13 08:23 | OK |
| RECEIVING FOR OTHERS | 689-565668 | AKASAKA OFFICE | 03/15 14:54 | OK |
| SIMULTANEOUS TRANSMISSION | 458992-2872 | OSAKA BRANCH | 03/16 16:38 | NG |
| SIMULTANEOUS TRANSMISSION | 5656-9820 | NAGOYA BRANCH | 03/20 07:09 | NG |
| SIMULTANEOUS TRANSMISSION | 26-23589 | FUKUOKA BRANCH | 03/23 15:30 | OK |
| AUTO RECEIVING | 102-2363 | KANTO OFFICE | 03/26 10:34 | OK |
| TRANSMISSION | 566-56562 | HOKKAIDO BRANCH | 03/30 09:15 | NG |
| REDUCTION TRANSMISSION | 365-9867 | KAGOSHIMA BRANCH | 04/11 12:45 | OK |
| MEMORY TRANSMISSION | 556-9854 | ITOH OFFICE | 04/23 22:45 | OK |

F1=TOTALLY ERASING

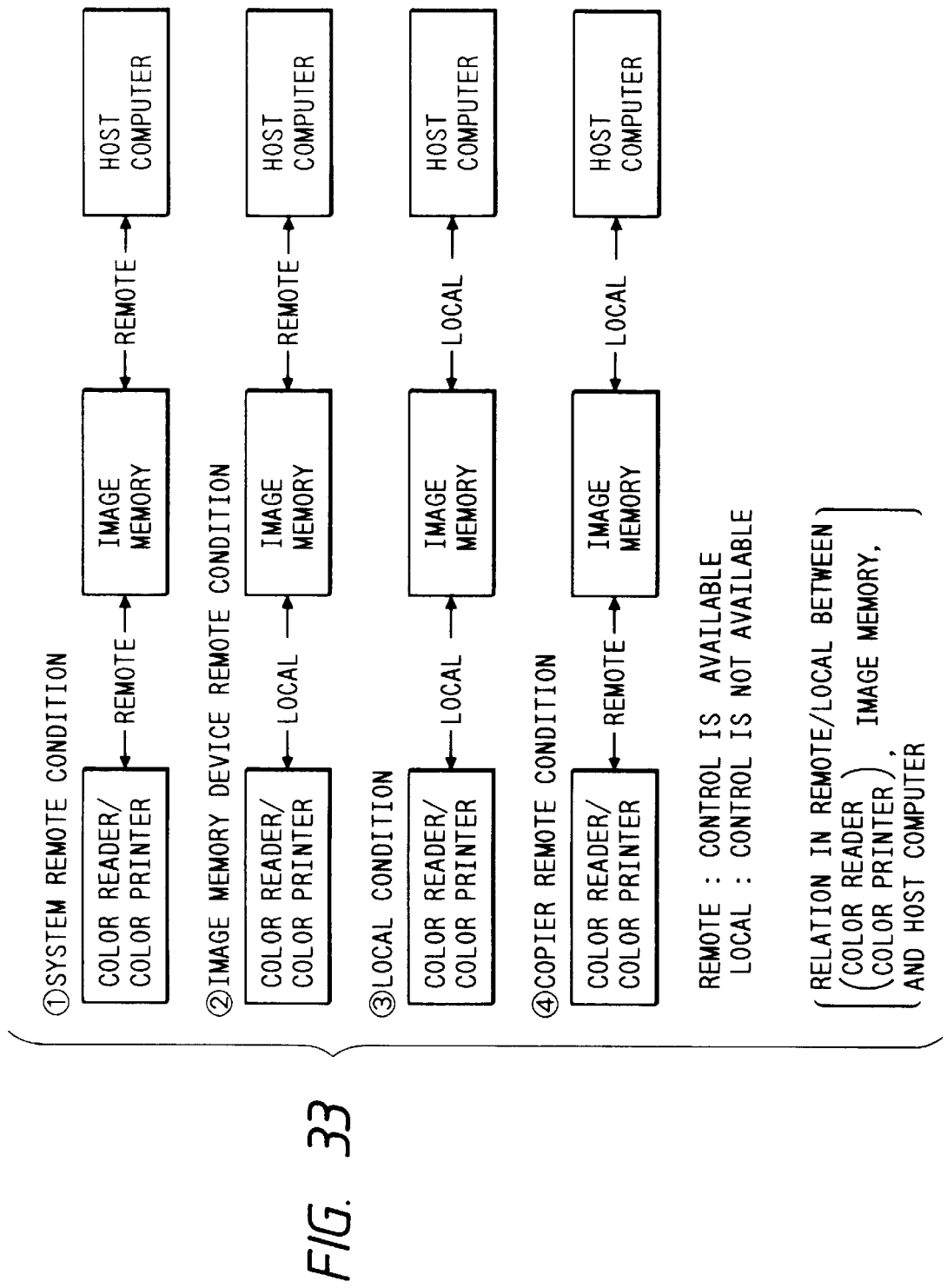

FIG. 34

DATA OF A PART OF IMAGE HEADDER

| | |
|---|---|
| PIXELS OF TOTAL IMAGES TO BE TRANSMITTED (HORIZONTAL) | ⎫ 110 |
| PIXELS OF TOTAL IMAGES TO BE TRANSMITTED (VERTICAL) | ⎭ |
| ORIGINAL SIZE TO BE TRANSMITTED | 111 |
| RESOLUTION | 112 |
| NUMBER OF BLOCKS TO BE TRANSMITTED | 113 |
| ONE BLOCK SIZE (HORIZONTAL) | ⎫ 114 |
| ONE BLOCK SIZE (VERTICAL) | ⎭ |
| OUTPUT PAPER TYPE | 115 |
| OUTPUT PAPERS | 116 |
| OUTPUT POSITION | 117 |
| OUTPUT TYPE (HARD DISK OR PRINT OUT) | 118 |
| ROTATING ? | 119 |
| RESERVE | 130 |
| COVER PAGE | 120 |

TOTAL 512 BYTE

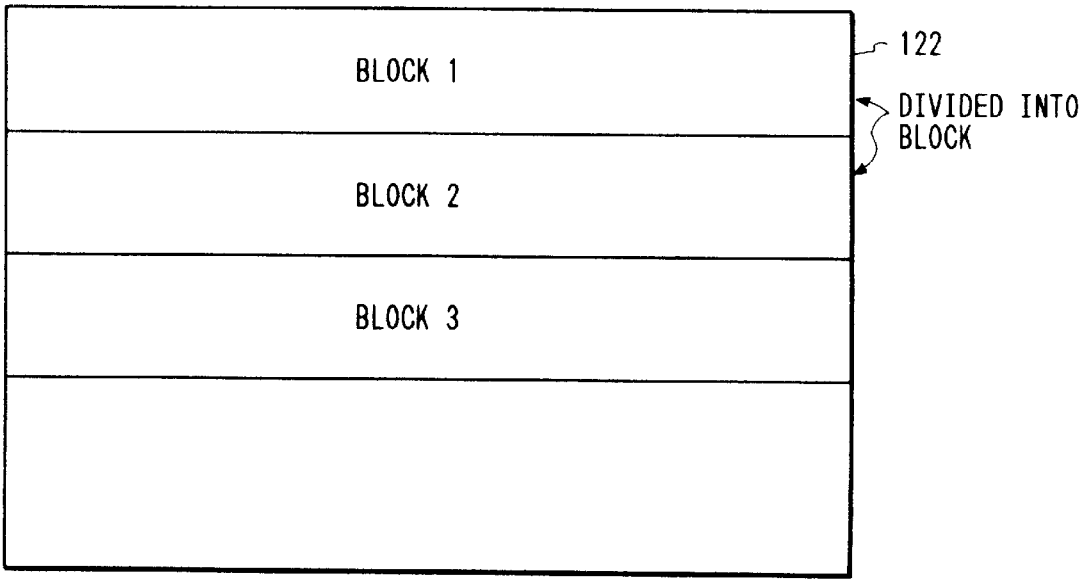

BLOCK 1 — 122
BLOCK 2
BLOCK 3

DIVIDED INTO BLOCK

IMAGE PROCESSOR CAPABLE OF OPERATION AS A FACSIMILE

This application is a continuation of application Ser. No. 07/861,032 filed Mar. 31, 1992, now abandoned.

BACKGROUND OF THE INVENTION

1. Field of the Invention

The present invention relates to an image processing system and an electronic apparatus.

2. Related Background Art

As a conventional digital copying machine system, a system consisting of a digital reader, a digital printer, and an image storage apparatus arranged independently of the copying machine system has already been known.

As a facsimile apparatus, an apparatus which includes a reader and a printer has also already been known.

However, in a conventional copying machine system, the digital reader, the digital printer, and the image storage apparatus are not sufficiently and effectively used.

An apparatus for adding a facsimile function to a copying machine is proposed as U.S. Pat. No. 4,878,130.

However, in such an apparatus, there is room for improvement in convenience of use and in versatility.

SUMMARY OF THE INVENTION

It is an object of the present invention to provide a novel image processing system, which can solve the above-mentioned problems, and has high versatility.

It is another object of the present invention to provide an image processing system, which can operate a copying machine consisting of a color reader and a printer as a facsimile apparatus.

It is still another object of the present invention to provide an image processing system, which can operate a color copying machine consisting of a color reader and a color printer as a color facsimile apparatus.

In order to achieve the above objects, according to an aspect of the present invention, there is disclosed a color image processing system having an image storage apparatus, and a reader and a printer which are connected to the image storage apparatus, comprising an electronic apparatus including control means for operating the processing system as a facsimile apparatus through the image storage apparatus.

It is still another object of the present invention to provide an image processing system, which can improve convenience of use.

It is still another object of the present invention to provide an electronic apparatus, which can operate a copying machine as a facsimile apparatus.

It is still another object of the present invention to provide a facsimile apparatus having a novel function.

Other objects and features of the present invention will become apparent from the following description of the embodiment taken in conjunction with the accompanying drawings.

BRIEF DESCRIPTION OF THE DRAWINGS

FIG. 21 is a view showing a display example on a CRT 60;

FIG. 22 is a view showing another display example on the CRT 60;

FIG. 23 is a view showing still another display example on the CRT 60;

FIG. 24 is a view showing still another display example on the CRT 60;

FIG. 25 is a view showing still another display example on the CRT 60;

FIG. 26 is a view showing still another display example on the CRT 60;

FIG. 27 is a view showing still another display example on the CRT 60;

FIG. 28 is a view showing still another display example on the CRT 60;

FIG. 29 is a view showing still another display example on the CRT 60;

FIG. 30 is a view showing still another display example on the CRT 60;

FIG. 32 is a view showing still another display example on the CRT 60;

FIG. 33 is a chart for explaining remote commands;

FIG. 34 is a view showing an image header;

DETAILED DESCRIPTION OF THE PREFERRED EMBODIMENT

An embodiment of the present invention will be described hereinafter with reference to the accompanying drawings.

Figure 1:
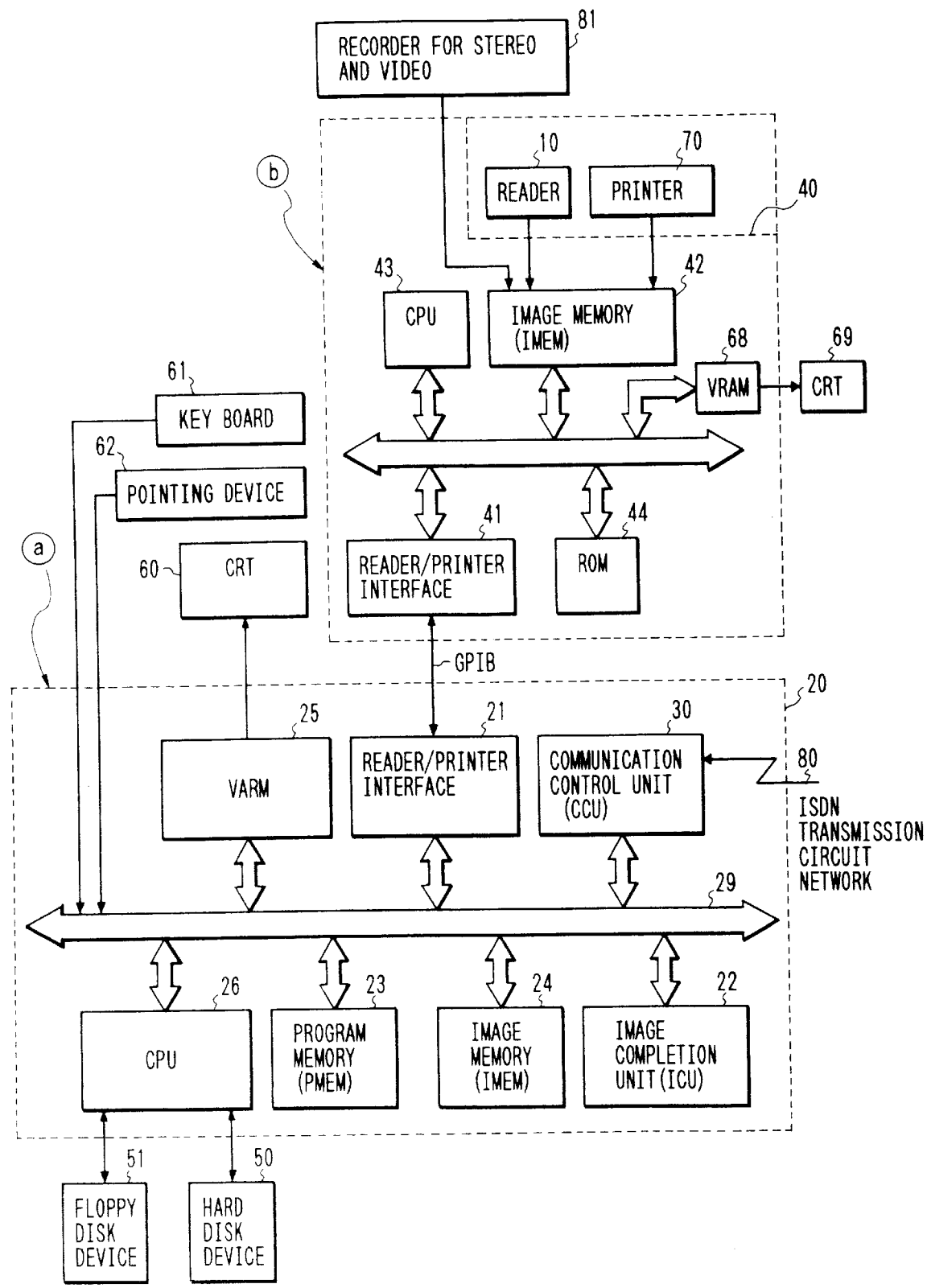
FIG. 1 is a block diagram showing the arrangement of a system according to the preferred embodiment of the present invention; This application is a continuation of application Ser. No. 07/861,032 filed Mar. 31, 1992, now abandoned.
Figure 2:
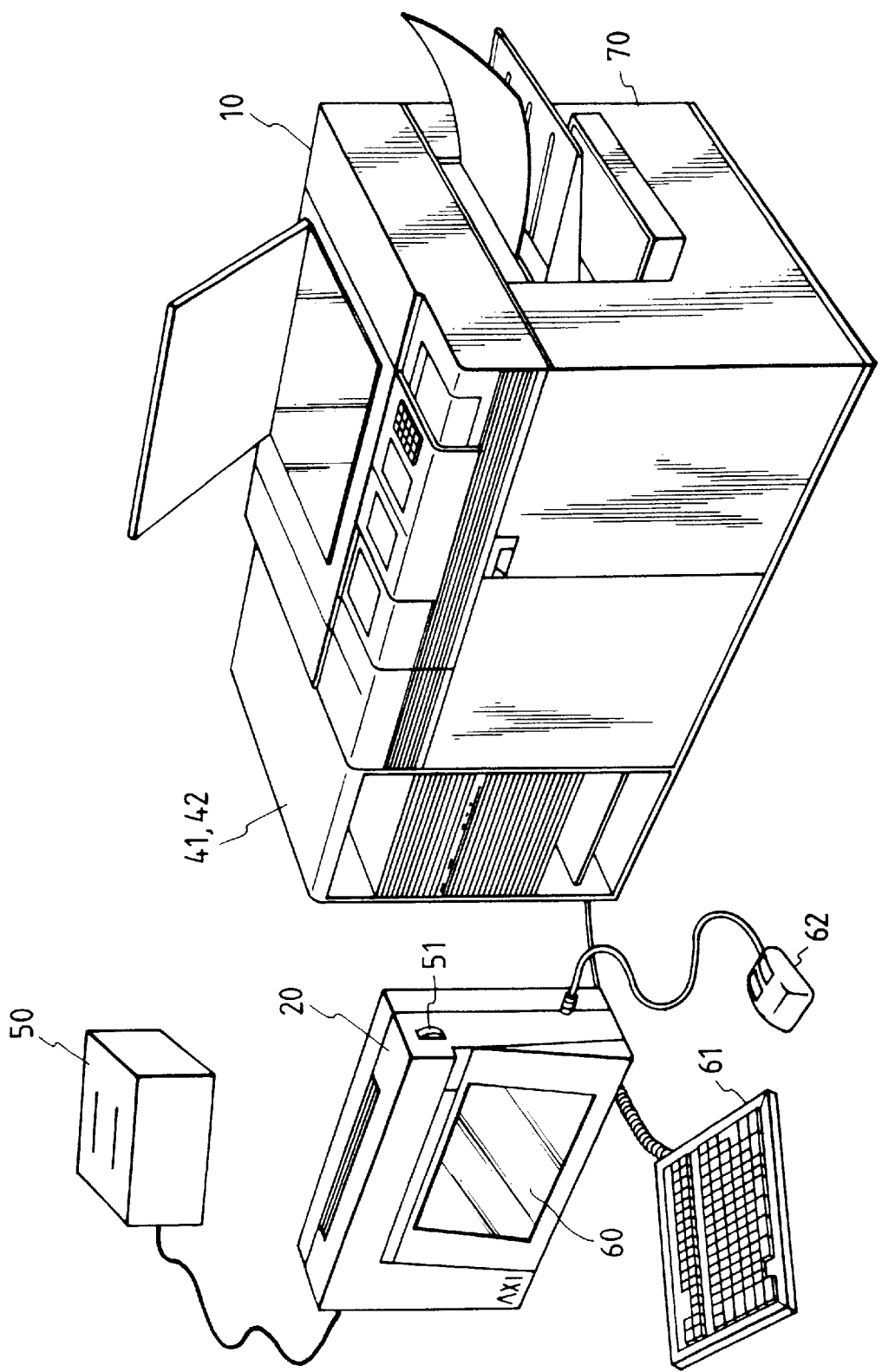
FIG. 2 is a perspective view showing the outer appearance of the system according to the embodiment of the present invention.

FIG. 1 is a block diagram showing an embodiment of the present invention, and FIG. 2 is a perspective view showing the preferred embodiment.

An image data processing system main body 20 surrounded by a dotted line a comprises a reader/printer interface 21, an image compression unit (to be referred to as an "ICU" hereinafter) 22, a program memory (to be referred to as a "PMEM" hereinafter) 23, an image memory (to be referred to as an "IMEM" hereinafter) 24 having a memory having a capacity of 1 Mbyte, and a memory having a bit map, a video RAM (to be referred to as a "VRAM" hereinafter) 25, a central processing unit (to be referred to as a "CPU" hereinafter) 26, a bus 29, and a communication control unit (to be referred to as a "CCU" hereinafter) 30. More specifically, the unit surrounded by the dotted line a is operated as a computer apparatus according to a given program.

The reader/printer interface 21 is an interface for causing a reader/printer unit (to be described later) surrounded by a dotted line b to output/input image data with the system main body 20. In order to execute these operations, the interface 21 can be operated in communication with the reader/printer unit by sending commands (to be described later), and receiving an ACK or NAK signal therefrom. The interface 21 normally employs a high-speed interface such as GPIB or SCSI to exchange image data. In this embodiment, the interface 21 comprises a GPIB (IEEE 488) interface. The interface 21 is connected to a reader/printer interface 41 through a GPIB interface.

The ICU 22 has a RAM area of about 128 KB. The ICU 22 issues an instruction for compressing or expanding data in advance, and then transfers data to this area, thereby compressing or expanding data. In order to increase a coding ratio, and to improve reproducibility of data, this embodiment adopts an AVQ (Adaptive Vector Quantization) method. However, the present invention is not limited to this compression method, and may adopt another method, e.g., a method called ADCT. The PMEM 23 has a memory area for an OS program and an application program for controlling I/O units arranged as peripheral circuits of the image data processing system main body 20, and the respective units in the image data processing system main body. The PMEM 23 has a memory management unit (MMEV), and also has a work area as a buffer for transmission data to be transmitted from a hard disk device 50 onto a transmission circuit, i.e., an ISDN circuit through the CPU 26 and the CCU 30, or transmission data to be stored from the CCU 30 to the hard disk device 50. Note that the buffer is used for synchronizing speeds of, e.g., disk lines. The PMEM 23 also stores code data of a document input at a keyboard 61.

The IMEM 24 of this embodiment has a capacity of about 2 Mbyte. The IMEM 24 stores an image from a reader 10, and also stores an image to be output to a printer 70.

The VRAM 25 stores image data for one frame to be displayed on a CRT 60 as bit map codes. Note that the VRAM 25 may also be used as a multi-value memory so as to cause the CRT 60 to display the content of the IMEM 24. A reader/printer unit 40 surrounded by the dotted line b comprises an image memory (IMEM) 42 for storing image data from the above-mentioned I/O units, the reader/printer interface 41 for communicating with the image data processing system 20 surrounded by the dotted line a, a CPU 43 for controlling these units, and a ROM 44. The IMEM 42 can store R, G, and B multi-value color data (8 bits per pixel for each of color components R, G, and B) for one frame corresponding to an A5 size, and has a bit map (text memory) corresponding to the A5 size.

The reader 10 reads a predetermined original, and outputs a color image signal. The color printer 70 is also arranged. The color printer of this embodiment may be of either an electrophotography type or an ink-jet type. That is, the type of printer is not limited. Furthermore, the color printer may be of a type for discharging an ink by film boiling.

The hard disk device 50 and a floppy disk device 51 are arranged as external memory devices of this embodiment. The hard disk device 50 is used for storing image data, and the floppy disk device 51 is used for inputting a program for operating the CPU 26. These devices are nonvolatile memories. As a nonvolatile memory, a backup memory may be used.

The keyboard 61 is used for inputting characters, and the like, and for inputting a selection instruction according to a message displayed on the CRT 60.

A pointing device 62 can input a selection instruction in place of the keyboard 61. A VRAM 68 is used for displaying data in the IMEM 42 as a visual image, and a CRT 69 displays the content of the VRAM 68.

A still video recorder 81 can be attached to the reader/printer unit 40. The image processing system is connected to a transmission circuit 80 such as an ISDN circuit.

FIGS. 3 to 20 are flow charts showing control operations of the CPU 26 of this embodiment. That is, FIGS. 3 to 20 are flow charts showing an operation sequence when the system 20 is constituted as a computer apparatus. Note that FIG. 21 and subsequent drawings show embodiments of frames displayed on the CRT 60.

Figure 3:
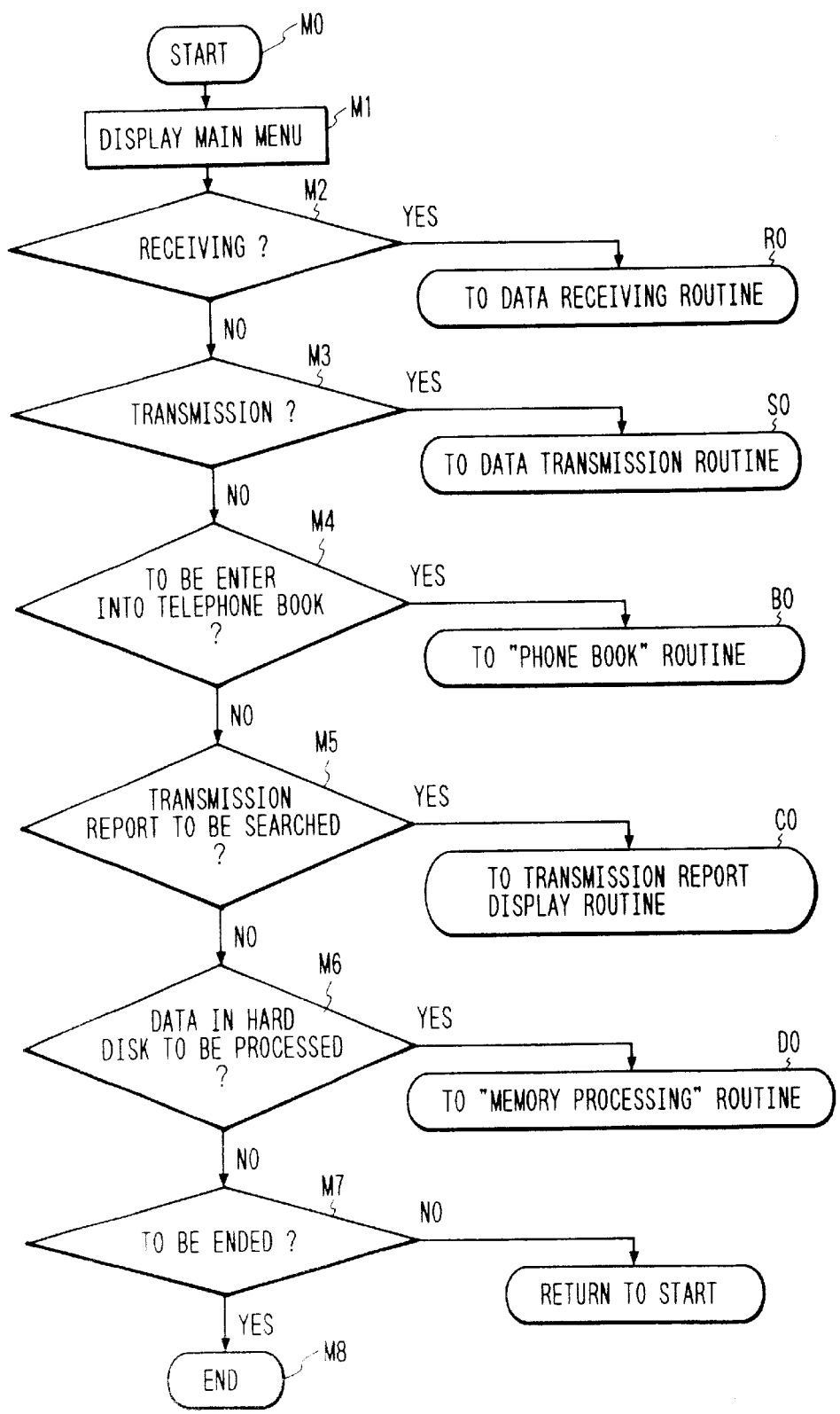
FIG. 3 is a flow chart showing processing during a display of a main menu.

In step M1 in FIG. 3, a main menu shown in FIG. 21 is displayed. As shown in FIG. 21, on the main menu, a user inputs a telephone number of the other party to be accessed, a sub address, a name of the other party to be accessed, a transmitting user name, and a transmitting user telephone number, and selects a paper size, a resolution, an auto re-dial mode, a "memory transmission with cover page" mode, and the like. It is then checked in step M2 if data is being received. The apparatus is automatically set in a data receiving mode, as needed. Therefore, when the apparatus receives data, no special operation is required (the flow advances to step R0).

In step M3, it is checked if data is to be transmitted. If YES in step M3, the flow advances to step S0 in FIG. 4.

It is checked in step M4 if a file called a "telephone book" including telephone numbers of other parties to be accessed, sub addresses, and names of other parties is to be registered, corrected, or deleted.

It is checked in step M5 if a transmission report is to be searched. Such files are stored in the work area of the PMEM 23.

It is checked in step M6 if data stored in the hard disk device 50 is to be output or deleted, or new data is input to the hard disk device 50. If YES in step M6, the flow advances to step D0.

It is checked in step M7 if the program is ended. Normally, the program is not ended, and is always active. The above-mentioned decision steps are attained by discriminating instructions from keys on the keyboard corresponding to the states of keys F1 to F6 on the main menu frame shown in FIG. 21, or instructions from the pointing device. In the following description, keys displayed in the frame are operated by keys on the keyboard or by the pointing device.

Figure 4:
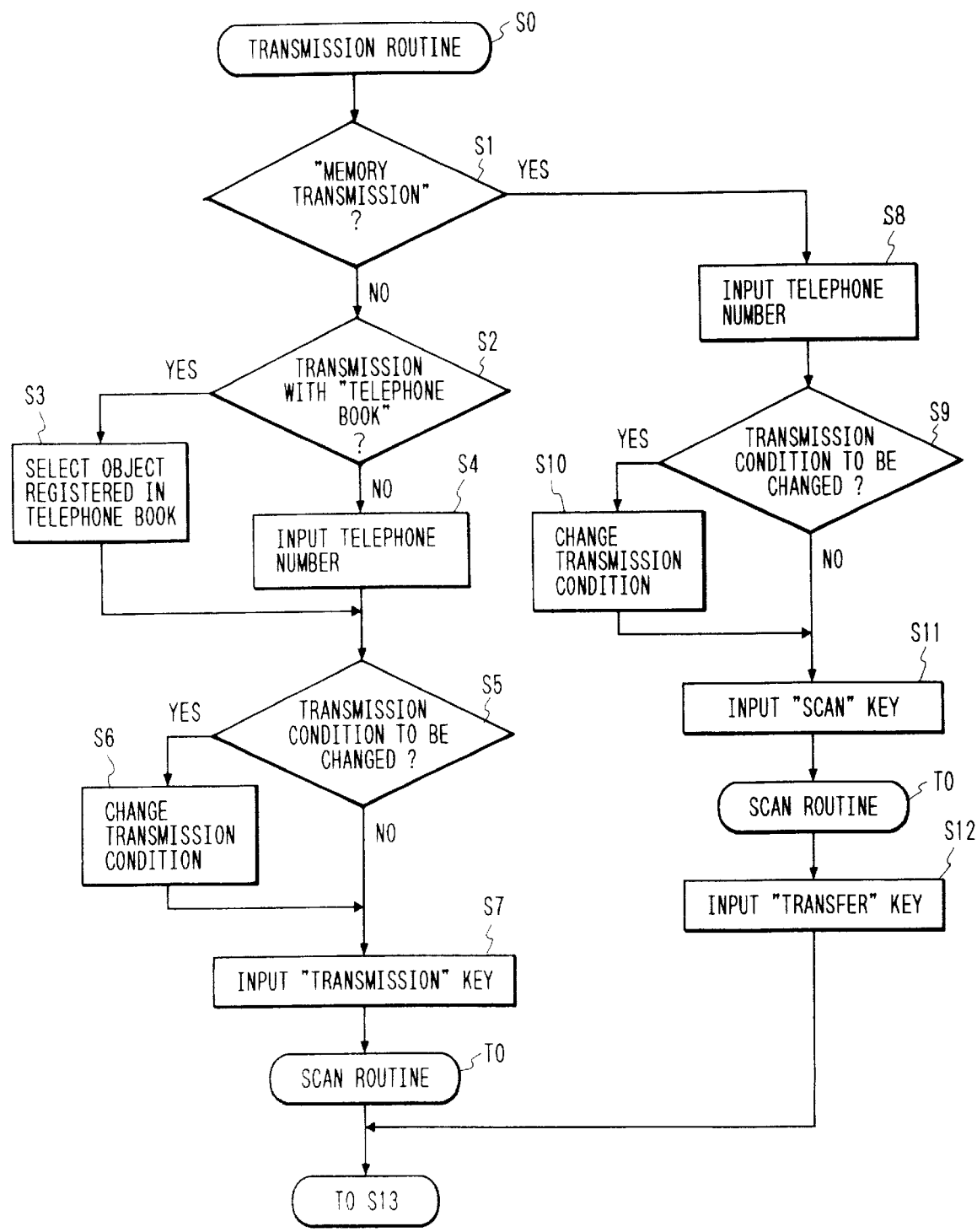
FIG. 4 is a flow chart showing a data transmission routine.
Figure 5:
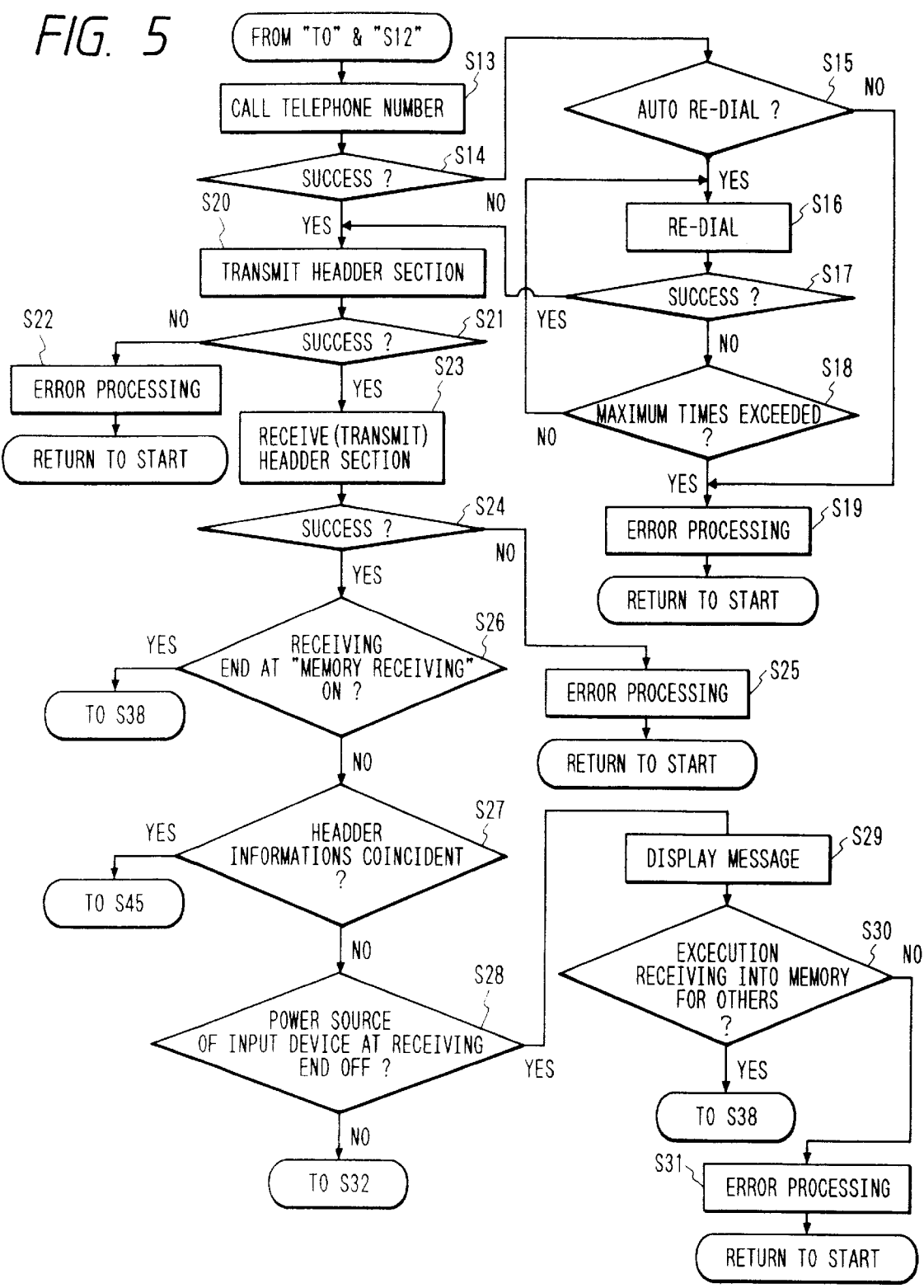
FIG. 5 is a flow chart showing the data transmission routine.
Figure 6:
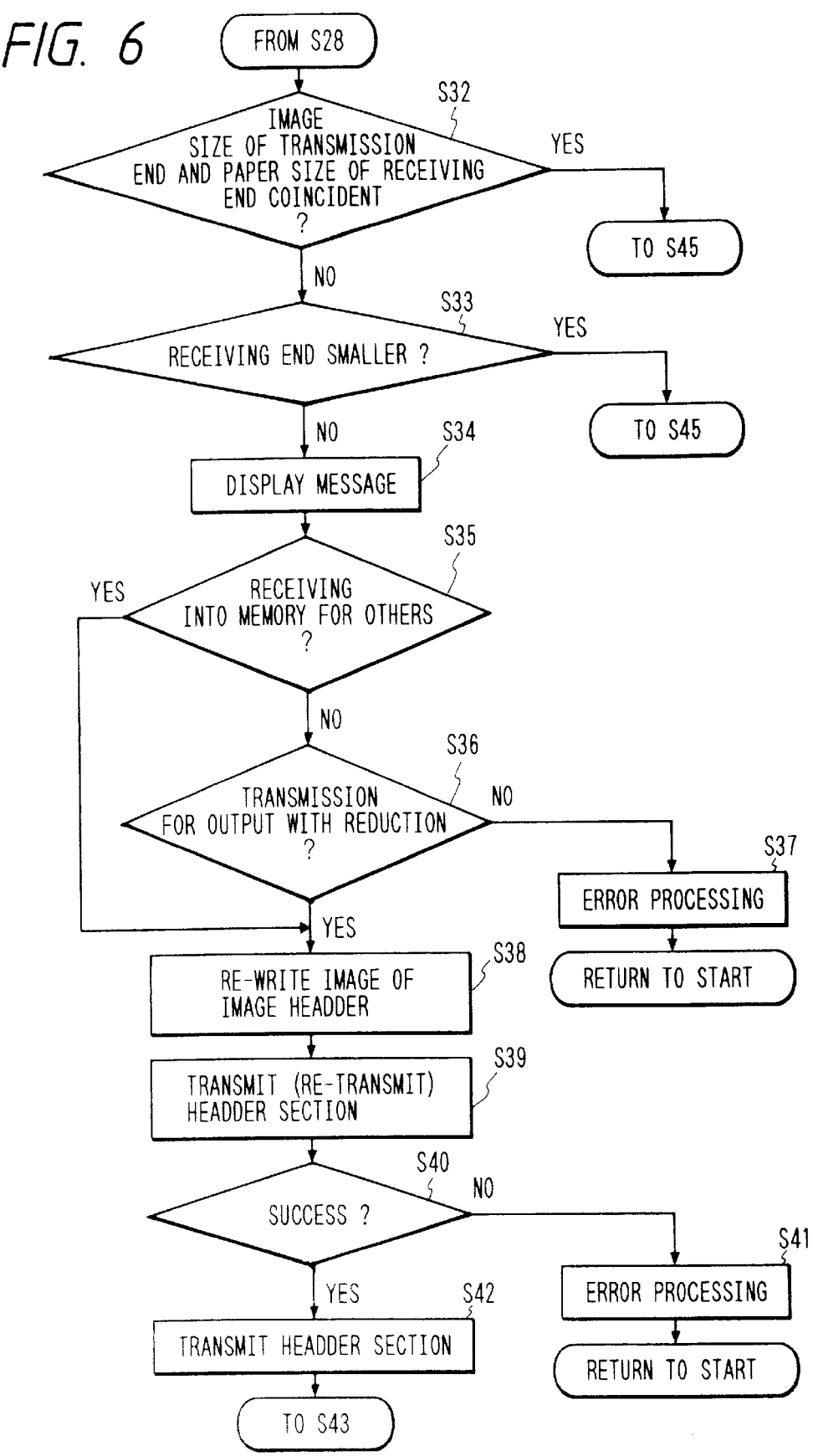
FIG. 6 is a flow chart showing the data transmission routine.
Figure 7:
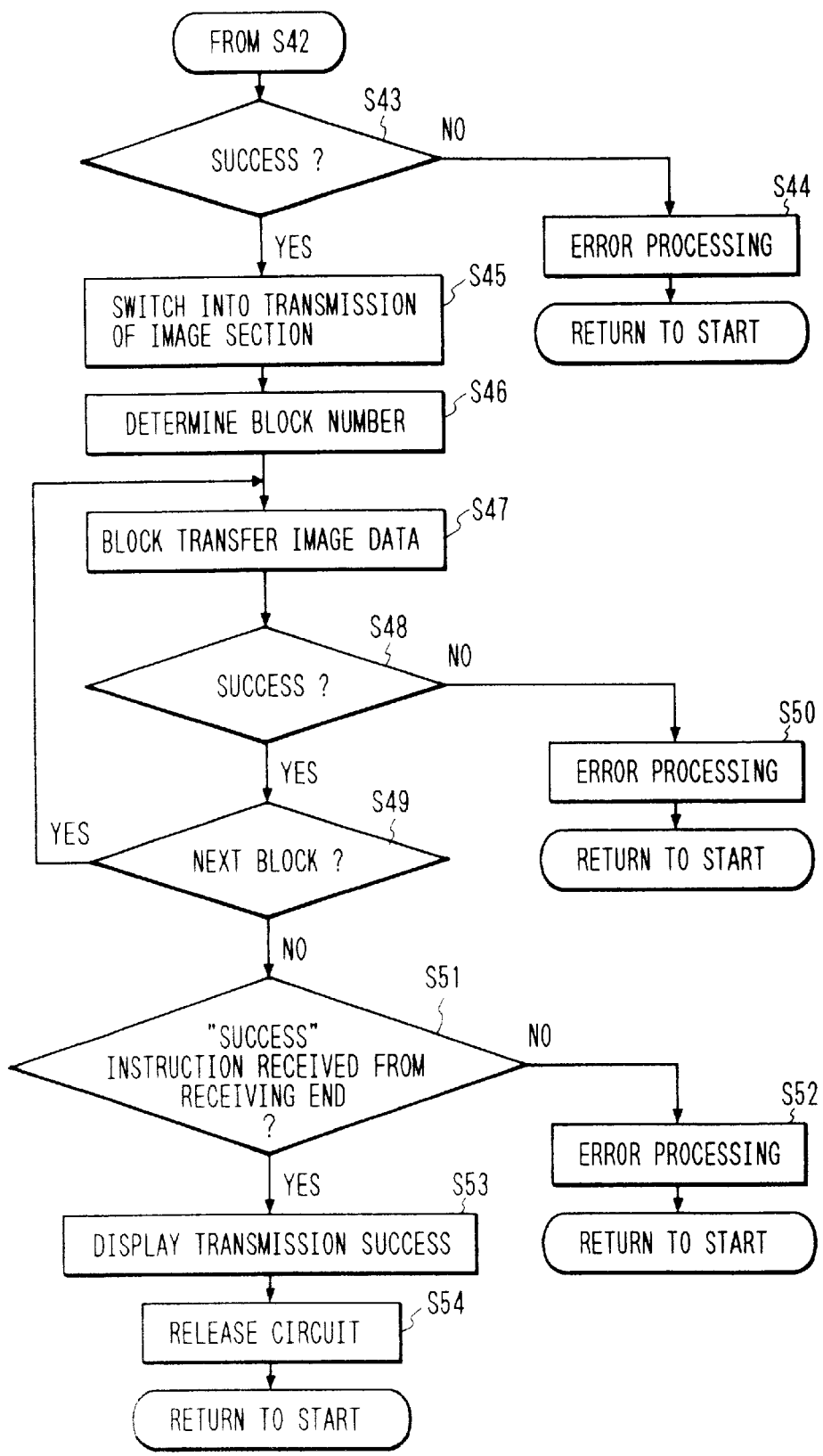
FIG. 7 is a flow chart showing the data transmission routine.

FIG. 4 is a flow chart showing the transmission routine. It is checked in step S1 if a "memory transmission" mode is set. In this case, judgment is made on the basis of information set by a user on a display frame shown in FIG. 22. In the "memory transmission" mode, data to be transmitted is temporarily saved in the hard disk device 50 in a compressed form, and is transmitted later, e.g., in a nighttime when the telephone charge is low. When the normal transmission mode is selected, the flow advances to step S2.

Figure 18:
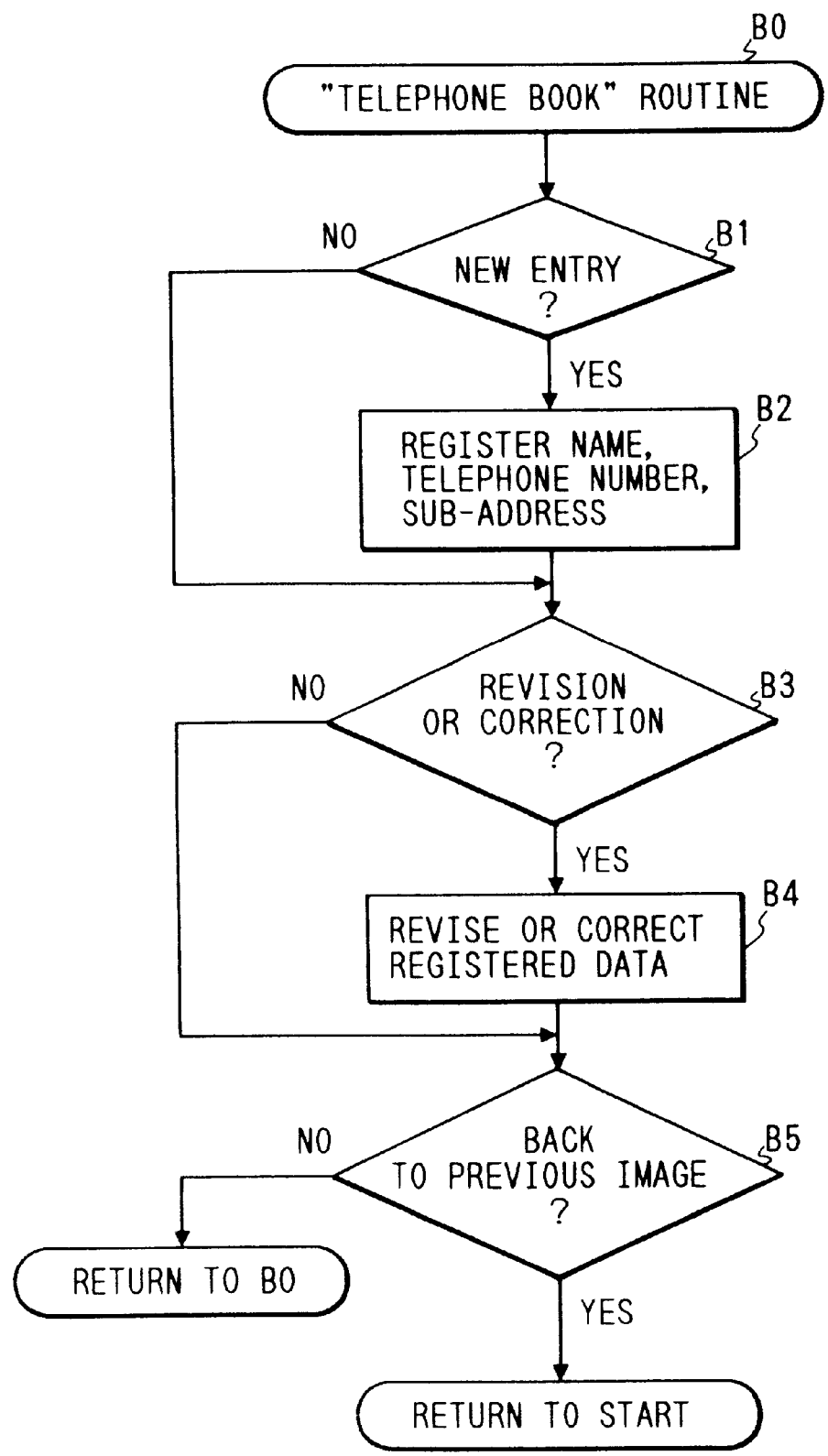
FIG. 18 is a flow chart showing a telephone book routine.

In step S2, it is checked if a transmission operation is performed using the above-mentioned "telephone book" file. This judgment is made by discriminating an instruction by a key F4 shown in FIG. 21. The "telephone book" is a menu for registering a name, telephone number, and sub address of the other party to be accessed in advance, as shown in FIG. 18. In this color image transmission system, since communication parties are limited, once information of other parties is input, an operation for inputting a telephone number in each transmission operation can be omitted.

Therefore, when a transmission operation is performed using the "telephone book", a destination is selected in step S3, as shown in FIG. 22. Furthermore, in this embodiment, a "simultaneous transmission" function can be used. As shown in FIG. 23, a plurality of destinations can be selected using a key. In FIG. 23, hatched destinations are selected.

When a transmission operation using the "telephone book" is not performed, the frame shown in FIG. 21 is called in step S4, i.e., a telephone number of the other party to be accessed, a sub address (if there is no sub address, it need not be input), and a name of the other party (which can be omitted) are input on the main menu from the keyboard 61. The input data are displayed on the CRT 60.

When a destination is determined in a transmission operation with or without the "telephone book", the flow advances to step S5 to check if "transmission conditions" are changed. The "transmission conditions" include a total of six items, i.e., the selection items of a paper size, a resolution, and an auto re-dial mode, the selection item of a "transmission with cover page" mode, the selection item of a "receiving into memory" mode, and the selection item of a color or monochrome transmission mode, as shown in FIG. 24. These setting conditions can be stored in the system. The system has default values, and these default values can be changed in step S6. More specifically, information displayed on the CRT 60 can be changed at the keyboard 61.

When data is to be transmitted under the above-mentioned preparation, an original to be transmitted is set on the reader 10, and a "transmission" key is depressed in step S7.

If the "memory transmission" mode is selected in step S1, the flow advances to step S8, and a telephone number, sub address, and name of the other party to be accessed are input. In step S9, it is checked if the above-mentioned "transmission conditions" are to be changed. If YES in step S9, the conditions are changed in step S10.

Thereafter, in step S11, a memory document frame shown in FIG. 25 is displayed, and a "scan" key F3 is input.

Figure 8:
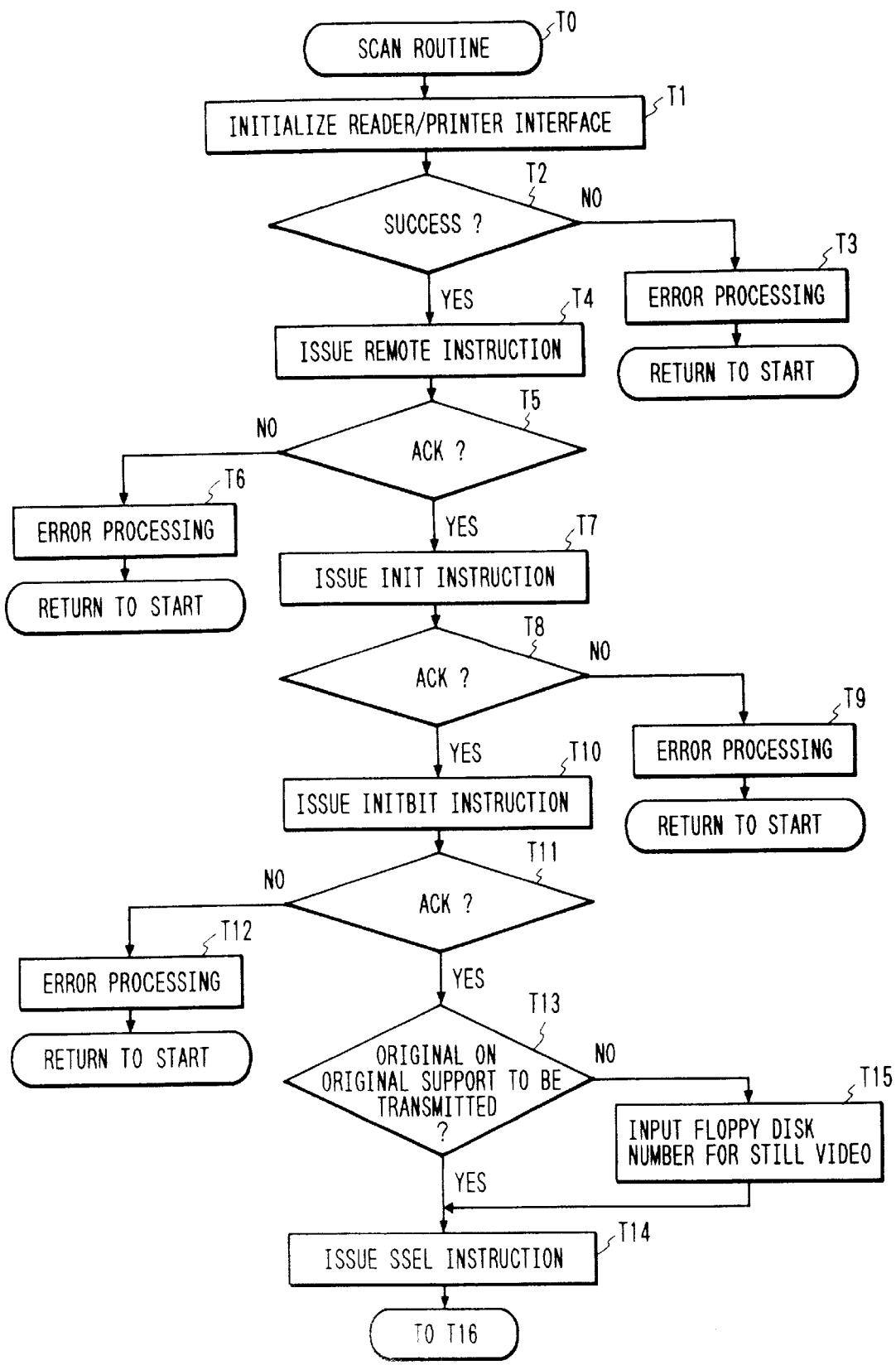
FIG. 8 is a flow chart showing a scan routine.
Figure 9:
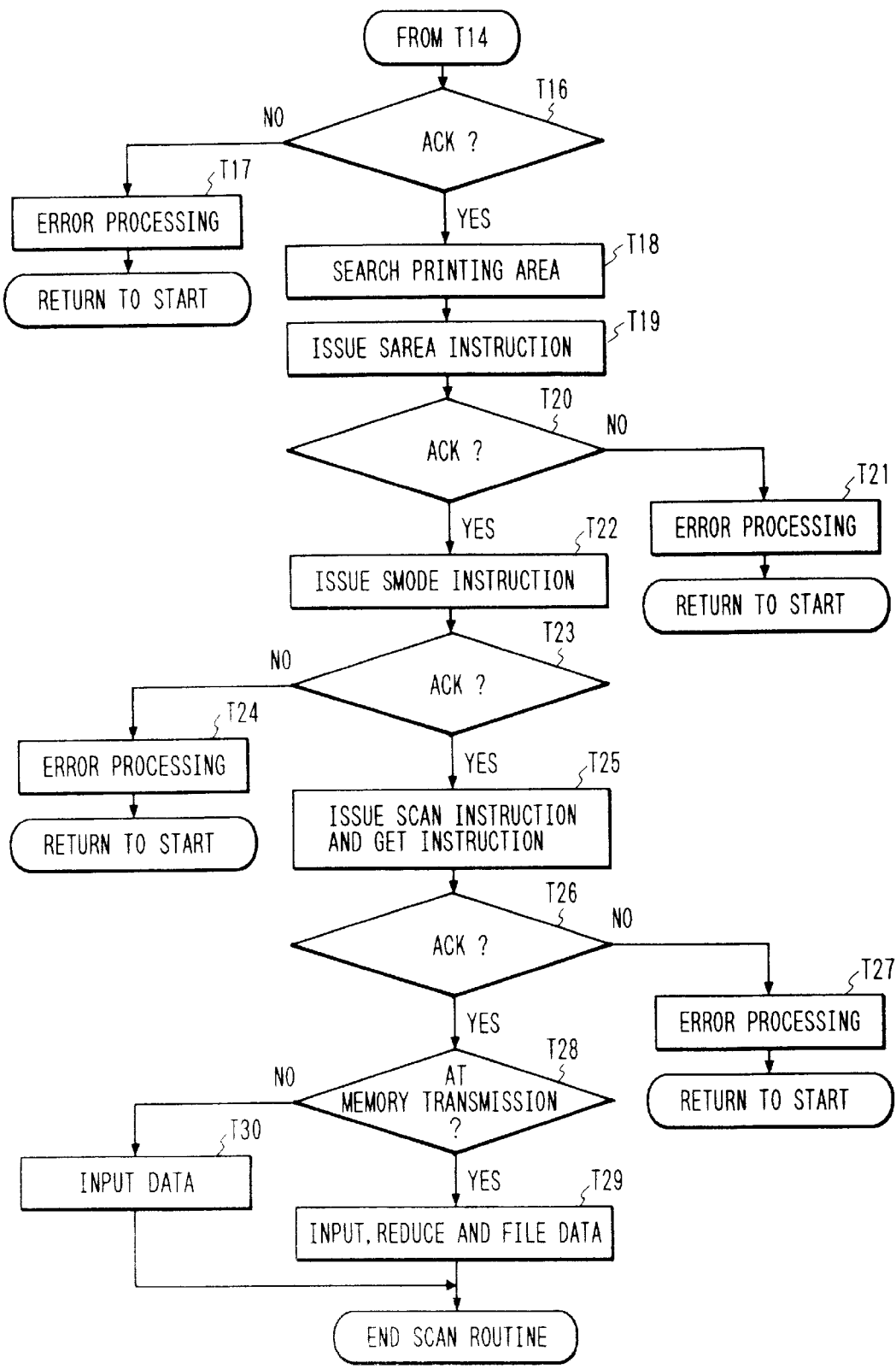
FIG. 9 is a flow chart showing the scan routine.

The control then enters a scan routine T0 shown in the flow chart of FIG. 8. In step T1, the program in the PMEM 23 is operated according to a command from the CPU 26, and initializes the reader/printer interfaces 21 and 41. This initialization is executed by supplying an initialization command. It is checked in step T2 if the initialization is successful. In this case, a status according to the command is detected. If it is determined that the initialization is unsuccessful, error processing is performed in step T3, and the flow returns to "start". In the following description, the error processing means the following processing unless otherwise specified.

Detailed error information is recorded in a file in the hard disk device 50, and "NG" is described in a "transmission report" to be described later. If a circuit is connected at the transmission end, it is disconnected. In the flow charts of this system, in general, if NO is determined in the step of judging "successful?", this means that processing is unsuccessful for some reason after a necessary number of times of retrials.

In step T4, the main body 20 issues a "REMOTE" instruction to the reader/printer unit 40. As described above, the reader/printer unit 40 is operated according to commands received from the main body 20, and sends back a response ACK (OK) or NAK (NG) to the main body 20.

The "REMOTE" instruction is an instruction for performing only a remote operation of the reader/printer unit 40 according to commands from the main body 20. When this instruction is canceled, the reader/printer unit 40 can be operated according to its own ROM 44 (can be used as a color copying machine).

In step T5, it is checked if the "REMOTE" instruction is successful. If YES in step T5, the reader/printer unit 40 sends back a signal meaning "ACK" to the main body 20. This remote state is a state for setting all the color reader, the color printer, and the IMEM 42 in the reader/printer unit 40 in the remote state, as indicated by ① in FIG. 33. FIG. 33 also illustrates, as other states, a mode ② for setting only the image memory in the remote state, a mode ③ for setting only the copying machine in the remote state, and a mode ④ for setting the respective units in a local state. If any abnormality occurs in the reader/printer unit 40, a signal "NAK" is sent back, and error processing is performed in step T6.

In step T7, an "INIT" instruction is issued from the main body to the reader/printer unit. This instruction is issued to initialize the state of the reader/printer unit 40, and the multi-value memory in the IMEM 42 is initialized. That is, the IMEM 42 is cleared. In response to this instruction, an ACK/NAK signal is sent back in step T8 to judge if the flow advances to step T9 or T10.

In step T10, an "INITBIT" instruction is issued to initialize the text memory in the IMEM 42. The IMEM 42 can be divided into image and text memories. The image memory is initialized by the "INIT" instruction, and the text memory is initialized by the "INITBIT" instruction. The text memory is a binary memory, and is used for forming a "cover page" when data is output with the "cover page", as will be described later. More specifically, as for an image such as a cover page, which can be sufficiently expressed by binary data, the binary memory is used to save the memory capacity. In addition, when the binary memory is used for characters, and the like, sharpness is improved, and hence, convenience of use is improved. An ACK/NAK signal is sent back in step T11 to determine if the flow advances to step T12 or T13.

In step T13, it is checked based on user's setting if a source to be transmitted is an original on the reader 10 or data in a still video floppy set in the still video recorder 81.

The flow then advances to step T14 to issue an "SSEL" instruction according to setting operations in steps T13 and T15. The "SSEL" instruction is a command for selecting one of an image on the reader or an image in the still video recorder as image data to the reader/printer unit 40. More specifically, an operand "1", "2", or "3" is added after the "SSEL" instruction in correspondence with the reader, the still video recorder, or a film scanner. If it is determined in step T13 that data to be input is not data obtained from the reader 10, it is automatically determined that data is obtained from the still video floppy. In step T15, a message for urging a user to input the number of order of an image in a floppy, and to input a "field" or "frame" storage method is displayed on the CRT 60, and urges the user to input the number of order and the storage method.

As will be described later, an operand indicating the "field" or "frame" storage method is added after an "SSEL2" instruction.

The flow advances to step T16 to receive a sent-back ACK/NAK signal, thereby determining if the flow advances to step T17 or T18.

Figure 35:
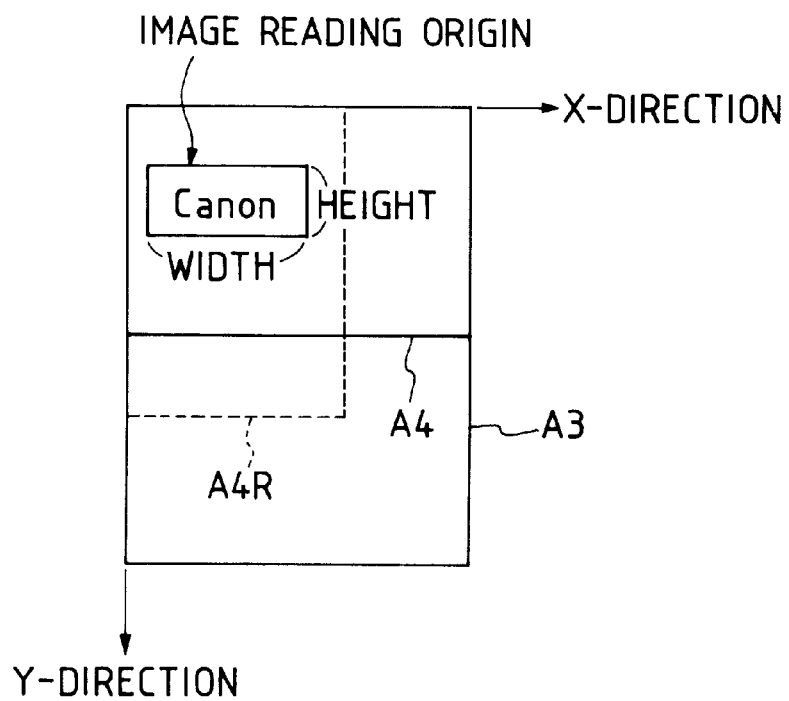
FIG. 35 is a view showing the origin of an image storage apparatus.

In step T18, since a reading area can be determined according to the paper size and the resolution set in the above-mentioned "transmission condition", and the capacity of the IMEM 42, a table is allocated on the PMEM 23, and is looked up to obtain the coordinates of the origin of an image storage position, and the length and width of the reading area, as shown in FIG. 35, on the basis of two pieces of information, i.e., the paper size and the resolution.

In step T19, an "SAREA" instruction is issued using the information of the reading area obtained in step T18 as parameters. The "SAREA" instruction is a command for designating the reading area.

When an ACK signal is sent back, an "SMODE" instruction is issued in step T22. In the "SMODE" instruction, parameters for changing the aspect ratio of an image in an input or output operation by independently receiving the length and width of an image, which have different values can be designated. When parameters are not particularly designated, parameters for inputting the length and width to attain an equal magnification are appended to issue the instruction in this embodiment. This instruction also designates a resolution. The resolution can be obtained with reference to data set in the above-mentioned transmission conditions (shown in FIG. 21).

With the above processing, input preparation is completed, and in step T25, a "SCAN" instruction is output. According to the "SCAN" instruction, the CPU 43 controls to input an image from the reader 10 (or from the still video recorder 81 when a still video input is selected), thus transferring image data into the IMEM 42.

Furthermore, in step T29, the image data is transferred from the reader/printer interface 41 to the reader/printer interface 21 of the main body. Then, a "GET" instruction is issued, so that the image stored in the IMEM 42 is divisionally transferred to the ICU 22, and the input image is compressed. The compressed image is stored in the hard disk device 50. At this time, the above-mentioned transmission conditions are also stored as another file in the hard disk device 50 in correspondence with the image. During this storage operation, a message "reading an original" is displayed on the CRT 60. After the image is temporarily input to the hard disk device 50 in the above-mentioned step, when the "memory transmission" operation is to be performed, the "memory document" menu is opened, and a display frame shown in FIG. 25 is displayed on the CRT 60, so that a document to be transferred is selected on the display frame. Note that FIG. 25 shows only received document names. However, in practice, a name of a document read by the reader 10 is often displayed. When a "transfer" key is input in step S12, the flow advances to step S13 for executing a data transmission operation.

Even when the "memory transmission" mode is not selected in step S1, if the "transmission" key is input in step S7, the control enters the scan routine T0, and the same processing as described above is performed. In step T30, an image is input by the "SCAN" instruction issued in step T25. In this case, after the image is transferred to the IMEM 42, the "GET" instruction is issued to divisionally store the data in the IMEM 24 of the main body side. During this storage operation, the CRT 60 similarly displays the message "reading an original". In order to improve transmission efficiency, unlike in the "memory transmission" mode, a method of inputting the entire image at once is not employed, but a means for inputting divided images, compressing the divided images, transmitting the compressed images, and then inputting the next image is employed. This means will be described in detail later.

Assume that an image to be transmitted is input, and a description of a transmission (communication) routine will be made below. In step S13 in FIG. 5, a designated telephone number is called. In this case, a message "calling" is displayed on the CRT 60. It is checked in step S14 if circuit connection is successful. If NO in step S14, the flow advances to step S15. In step S15, the setting state of the "auto re-dial" mode in the above-mentioned "transmission conditions" is checked, and if "YES" is selected, a re-dial operation is performed in step S16. In this case, reception is rejected in an auto re-dial standby state. Therefore, a re-dial operation for transmission can be reliably performed. For this reason, assume that the maximum number of times of auto re-dial operations, and a time interval between adjacent re-dial operations are set in advance. Processing in this case is executed in steps S15, S16, S17, S18, and S19.

If it is determined that the circuit connection is successful, a "header" of data is transmitted in step S20.

As shown in FIG. 34, the header information to be transmitted includes information 110 representing the numbers of pixels of total images (in the horizontal and vertical directions), information 111 representing an original size, information 112 representing the resolution, information 113 representing the number of divided blocks, information 114 representing the size (in the horizontal and vertical directions) of one block size, information 115 representing the type of output paper sheet, information 116 representing the number of output sheets, information 117 representing the output position on a recording sheet at the receiving end, information 118 representing an output type (indicating whether data is stored in a hard disk or printed out at the receiving end), information 119 representing whether or not the receiving end performs rotation processing of color image data, and outputs the processed data, and information 120 indicating whether or not the "transmission with cover page" mode is selected. With the above-mentioned block processing, data 122 compressed in units of blocks are sequentially transmitted in units of blocks. Every time each block data is transmitted, transmission/reception of block data can be executed in a communication protocol.

The information indicating whether or not the "transmission with cover page" mode is selected is not limited to information merely indicating whether or not a cover page is attached, but may be information indicating whether or not binary image data is transmitted, i.e., whether or not the text memory in the image memory is used.

The "header" information is sent to a destination to check if the destination station is in the receiving state.

If it is determined in step S21 that transmission of the header is successful, i.e., when a header ACK signal is sent back from the receiving end, header information from the receiving end is received in step S23. If it is confirmed that the header information is received, and if it is determined in step S26 that the "memory receiving" mode is ON at the receiving end, the flow advances to step S28. In step S27, the sent-back header information is checked to determine if two pieces of header information coincide with each other. If YES in step S27, the flow advances to step S45; otherwise, the following troubles are checked. In step S28, the ON/OFF state of the power source of the reader/printer unit 40 at the receiving end is checked. If the power source is OFF, a message shown in FIG. 26 is displayed on the CRT 60 in step S29 to urge a user in step S30 to select whether or not a "receiving into memory" mode is executed. If the "receiving into memory" mode="ON" is selected in the above-mentioned "transmission conditions" in FIG. 21, the "receiving into memory" mode can be automatically started even when such a trouble occurs. In this case, the power source of the reader/printer unit at the receiving end is OFF when the "receiving into memory" mode="OFF" is selected.

When the "receiving into memory" mode is executed, the flow advances to step S38, the content of the image header is changed, i.e., the destination is changed from the printer unit to the hard disk device. On the other hand, when the "receiving into memory" mode is not executed, error processing is performed in step S31, and the flow returns to "start".

In step S32, it is checked if the paper size (original size) at the transmission end coincides with the paper size at the receiving end. As will be described later, the receiving end has a command capable of automatically checking the cassette paper size loaded into a color printer.

If the two paper sizes coincide with each other, the flow advances to step S45, and image data is transmitted. However, if the two paper sizes do not coincide with each other, it is checked in step S33 which paper size is larger. If it is determined that the paper size at the transmission end is smaller, since transmission can be continued, the flow advances to step S45 to transmit image data. However, if the paper size at the transmission end is larger, a message shown in FIG. 27 is displayed on the CRT 60 in step S34 to urge a user in steps S35 and S36 to select whether the "receiving into memory" mode is executed without changing the paper size, or image data is transmitted and output in a reduced scale, or transmission is interrupted.

If it is selected that the transmission is interrupted, error processing is performed in step S37. However, if the "receiving into memory" mode is selected, the flow advances to step S38 to change the content of image header information, i.e., to change the destination from the printer unit to the hard disk device. If it is selected that the image data is output in a reduced scale, the content, i.e., the paper size, of the image header information is changed in step S38.

In the above-mentioned steps, if data to be transmitted is a still video image, the data is output in the smallest selected paper size of A4, B4, and A3.

As described above, when the contents of the image header information do not coincide with each other in step S27, and when reduction output is permitted, the content of the image header information at the transmission end is corrected in step S38, and the image header information is transmitted again from the transmission end to the receiving end in step S39. The transmission end checks based on an ACK signal in step S40 if the transmission is successful, i.e., the header information is received at the receiving end. If YES in step S40, the image header information from the destination is received in step S42. In this case, when the "receiving into memory" mode is executed, if an error message is sent back from the receiving end due to, e.g., an insufficient remaining capacity of the hard disk device at the receiving end, the flow advances to step S41. On the other hand, if it is determined that reception of the header information from the receiving end is successful, the flow advances to step S45 to transmit image data.

Different image data transmission processing operations must be performed depending on whether or not the "memory transmission" mode is selected. More specifically, when the "memory transmission" mode is selected, all the data are compressed and stored in the memory; otherwise, image data in the IMEM 42 are divisionally and sequentially output to the ICU 22. However, these two operations have the same basic flow. When the "memory transmission" mode is not selected, a portion (to be referred to as a block hereinafter) of compressed image data already stored in the IMEM 24 at the main body side in the above-mentioned scan routine TO is transmitted onto the transmission circuit 80 through the CCU 30 in step S47. During transmission, a message shown in FIG. 28 is displayed on the CRT 60. Note that the bar graph in FIG. 28 represents a transmitted area with respect to the entire data.

The input operation of divided image data in the next block can be started before the end of transmission on the transmission circuit 80. This allows data transfer from the reader/printer unit 40 to the IMEM 24 at the main body side by providing a double buffer structure to the main body side. More specifically, data transferred from the reader/printer interface 41 of the reader/printer unit side is temporarily stored in the work area of the PMEM 23 in the RAM at the main body side, and is then transferred to the area in the ICU 22. The data is subjected to compression processing in this area, and compressed data is stored in the same area again. More specifically, when block transfer is performed, data is compressed in the ICU 22, and during transmission of the compressed data onto the transmission circuit 80, the next block can be loaded from the reader/printer interface 21 into the already released work area of the PMEM 23 other than the area used for transmitting data onto the transmission circuit.

In step S46, as for the number of blocks in transmission, a table allocated in the program to determine the proper number of blocks based on the paper size and the resolution is read out, thereby automatically selecting an optimal number of blocks.

As described above, compressed data are transferred in units of blocks in steps S47, S48, and S49.

When the "memory transmission" mode is selected, compressed data stored in the hard disk device 50 by the above-mentioned scan routine T0 is transferred again to the CCU 30, thereby transmitting the data onto the transmission circuit 80. During transmission, a message shown in FIG. 29 is displayed on the CRT 60. In this case, block transfer is performed like in the above case. When the state of block transfer is displayed, display according to the number of transmitted blocks is made, as indicated by the bar graphs in FIGS. 28 and 29. The display states shown in FIGS. 28 and 29 are common. This is to employ the same format and communication protocol of data on the transmission circuit 80 independently of the "memory transmission" mode so as to standardize processing of the program at the receiving end.

When transmission of image data is completed by the above-mentioned method, and a signal indicating end of reception is received from the receiving end without causing, e.g., an image printing shift on a paper sheet when the image is output in step S51, the flow advances to step S54 to release the circuit. Thereafter, in step S53, a message "transmission is successful" is displayed on the CRT 60, thus ending transmission processing.

FIG. 30 shows a message on the CRT 60 when data is transmitted using the "telephone book". When data is transmitted using the "telephone book", as shown in FIG. 30, a window for displaying a message "transmission continues" is displayed to overlap the "telephone book" image.

During transmission, the transmission can be stopped by inputting a "stop" key.

Figure 10:
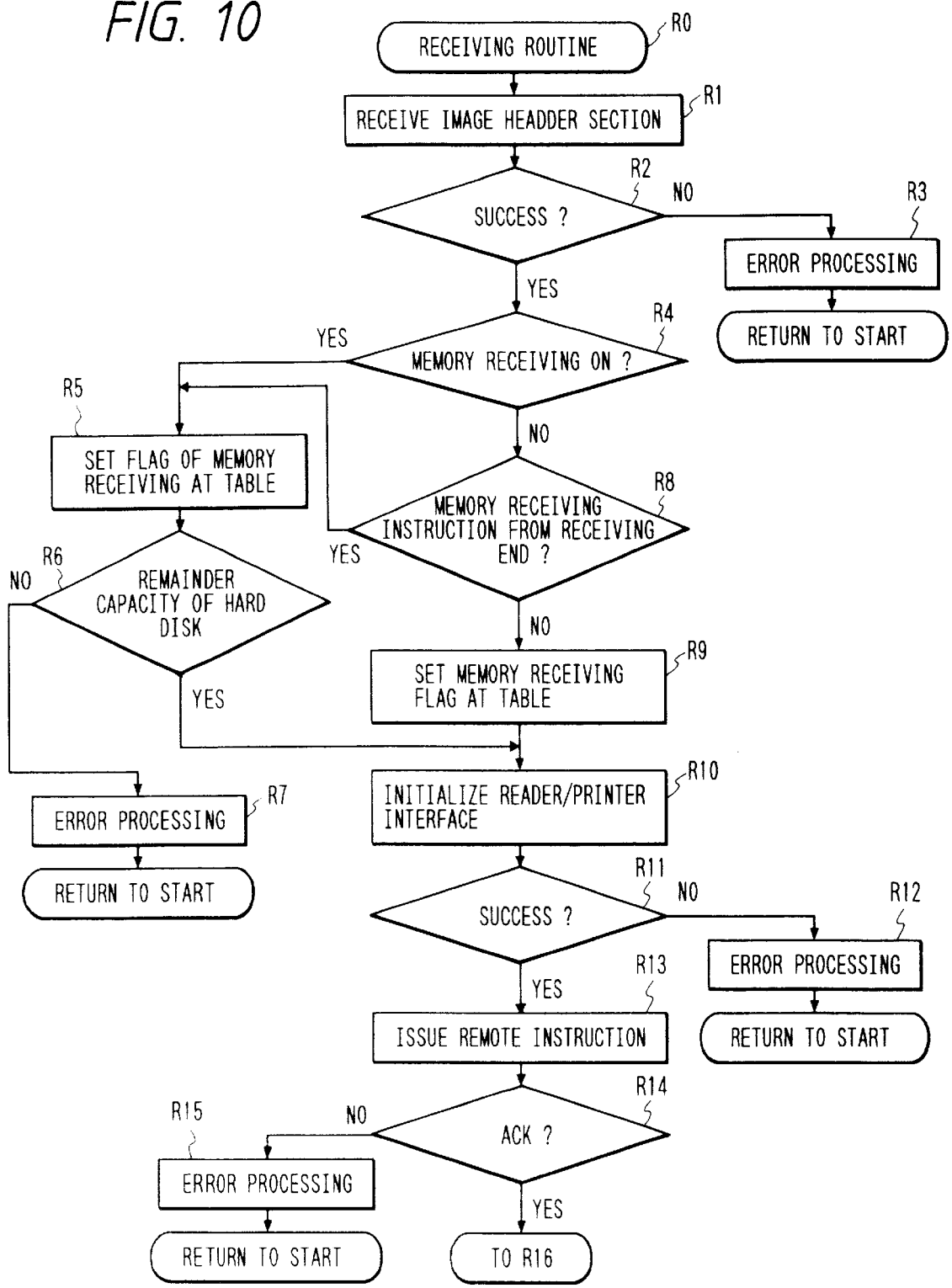
FIG. 10 is a flow chart showing a data receiving routine.
Figure 11:
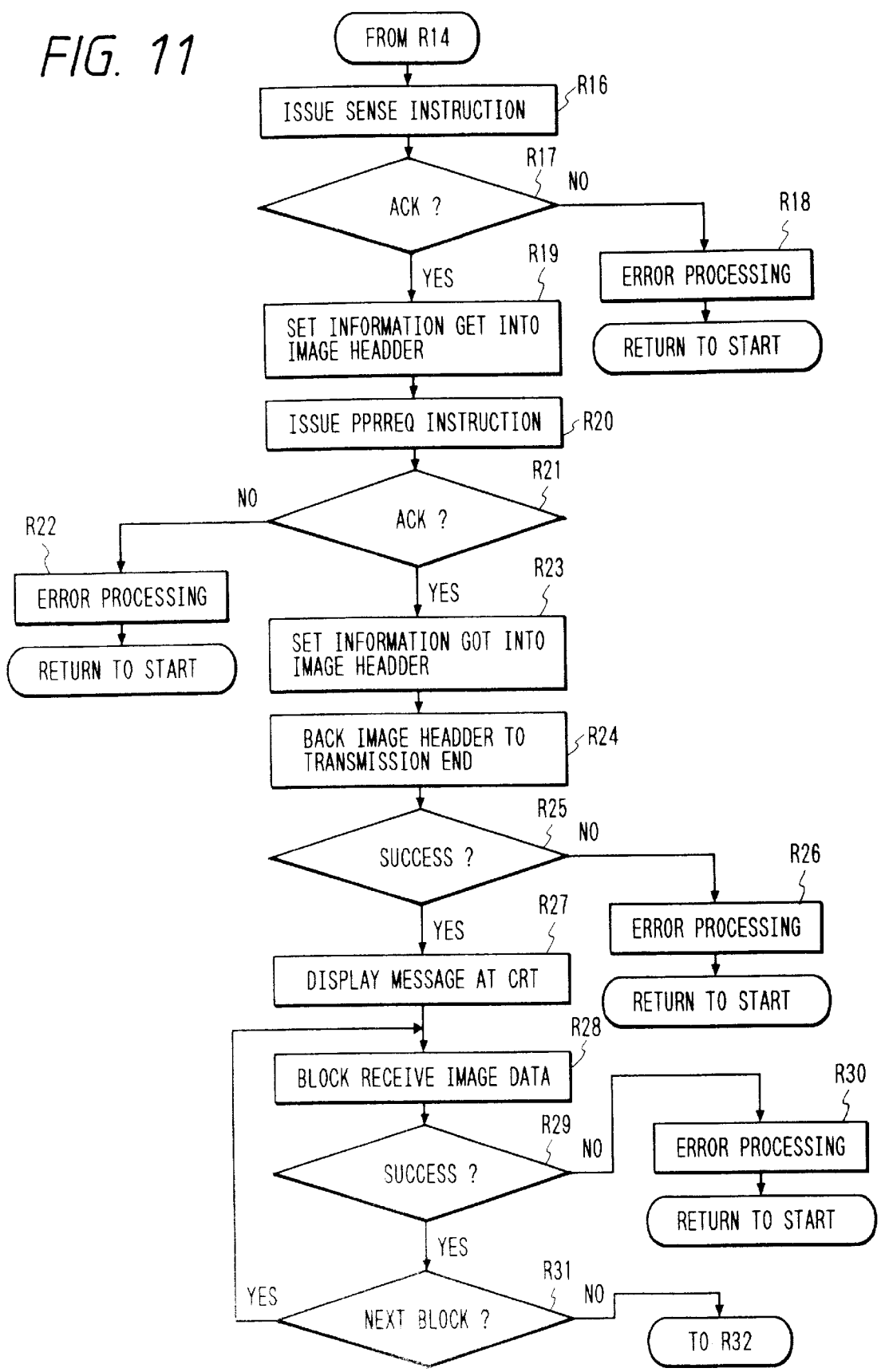
FIG. 11 is a flow chart showing the data receiving routine.
Figure 12:
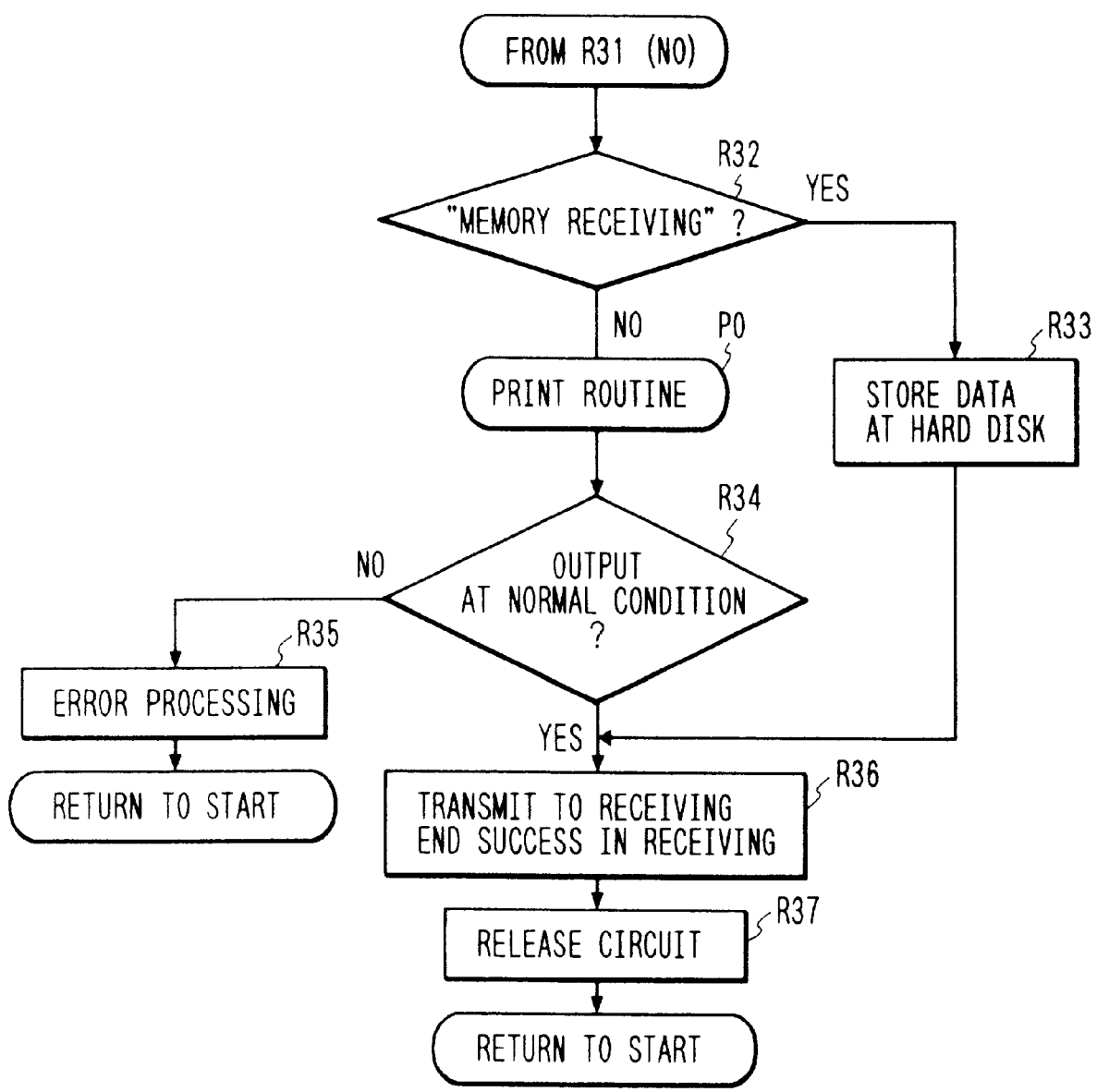
FIG. 12 is a flow chart showing the data receiving routine.

The receiving routine will be described below. FIG. 10 is a flow chart showing the receiving routine.

The receiving operation is performed based on a call from the transmission end under a condition that the circuit has already been connected to the transmission end.

In step R1, the above-mentioned information portion called "image header" of transmission data is received from the transmission end. In step R2, it is checked if reception of the image header is successful. If YES in step R2, the flow advances to step R4; otherwise, the flow advances to step R3 to execute the above-mentioned error processing.

In step R4, it is checked if the "receiving into memory" mode in the above-mentioned "transmission conditions" is ON at the receiving end. If YES in step R4, the flow advances to step R5, and a "receiving into memory" flag in a table prepared in the program at the receiving end is set to be ON. The flow advances to step R6 to check if the remaining capacity of the hard disk device 50 is sufficient. If NO in step R6, the flow advances to step R7, and error processing is performed. On the other hand, even if it is determined in step R4 that the "receiving into memory" mode is OFF, when the paper sizes do not coincide with each other, and the "receiving into memory" mode is instructed from the transmission end after the image header information is exchanged again, or when the power source of the reader/printer unit at the receiving end is OFF, and the "receiving into memory" mode is instructed from the transmission end after the image header information is exchanged again, the flow advances to step R5, and the above-mentioned processing is performed. Otherwise, the flow advances to step R9, and the "receiving into memory" flag in the table prepared in the program at the receiving end is reset to an OFF state.

The flow advances to step R10. In step R10, the program in the PMEM 23 is operated to initialize the reader/printer interfaces 21 and 41 according to an instruction from the CPU 26. The initialization in this case includes a pre-procedure for starting a communication. In step R11, it is checked if the pre-procedure is successful. If NO in step R11, error processing is performed in step R12, and the flow returns to "start".

In step R13, the main body 20 issues a "REMOTE" instruction to the reader/printer unit 40. As described above, the reader/printer unit 40 is operated according to commands received from the main body 20 side, and sends back a response ACK (OK) or NAK (NG) to the main body 20 side.

The "REMOTE" instruction is an instruction for operating the reader/printer unit 40 according to only commands from the main body 20.

In step R16, the main body issues a "SENSE" instruction to the reader/printer unit. This instruction is used for checking the state of the reader/printer unit 40, i.e., for checking whether or not the size (capacity) of the IMEM 42 in the reader/printer unit 40 and the state of the printer 70 are normal. In step R19, these pieces of information are set in a designated area 120 in FIG. 34 of the image header.

In step R20, a "PPRREQ" instruction is issued. This instruction is used for checking the state of cassettes set with output paper sheets, which cassettes are loaded in the color printer in the reader/printer unit 40. The color printer of this embodiment can load two, i.e., upper and lower cassettes, and can detect the cassette sizes of upper and lower cassette slots. The detection result is set in a designated area 115 in FIG. 34 of the image header in step R23.

The image header set with the state of the apparatus at the receiving end on the basis of the above-mentioned information is sent back to the transmission end in step R24. In step R25, it is checked if this transmission is successful. If YES in step R25, image data is received.

Figure 31:
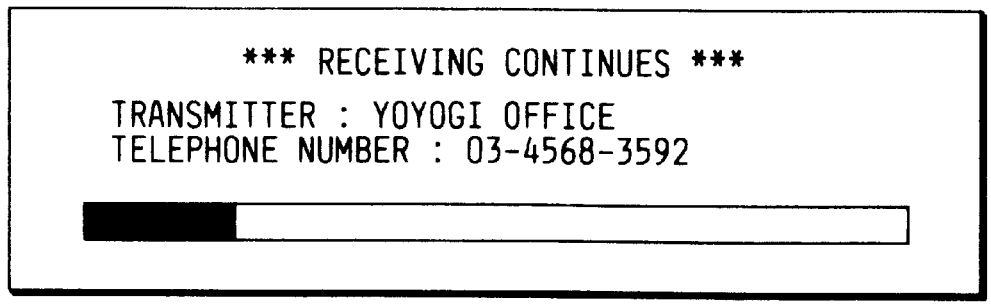
FIG. 31 is a view showing still another display example on the CRT 60.

In step R27, a message "receiving continues" shown in FIG. 31 is displayed on the CRT 60. In steps R28, R29, R30, and R31, image data is divisionally received in units of blocks. In the receiving operation, graphic display according to the number of received blocks is made. The different image data receiving processing operations must be performed depending on whether or not the "receiving into memory" mode is selected. However, these two operations have the same basic flow. When the "receiving into memory" mode is selected, the CCU 30 receives the divided image data transmitted from the transmission circuit 80, the ICU 22 expands compressed data in units of blocks, and the expanded data are transferred to the IMEM 24. Furthermore, the expanded image data block transferred to the IMEM 24 is then sent to the reader/printer interface 41 of the reader/printer unit 40 through the reader/printer interface 21 of the main body 20, and is stored in the IMEM 42. In this processing, the same processing as the high-speed processing at the transmission end attained by providing the double buffer structure is performed at the receiving end. More specifically, while a given image data block is transferred between the reader/printer interface 21 of the main body and the reader/printer interface 41 of the reader/printer unit, the next data block can be received from the transmission circuit 80, and can be expanded by the ICU 22 through the CCU 30.

Figure 13:
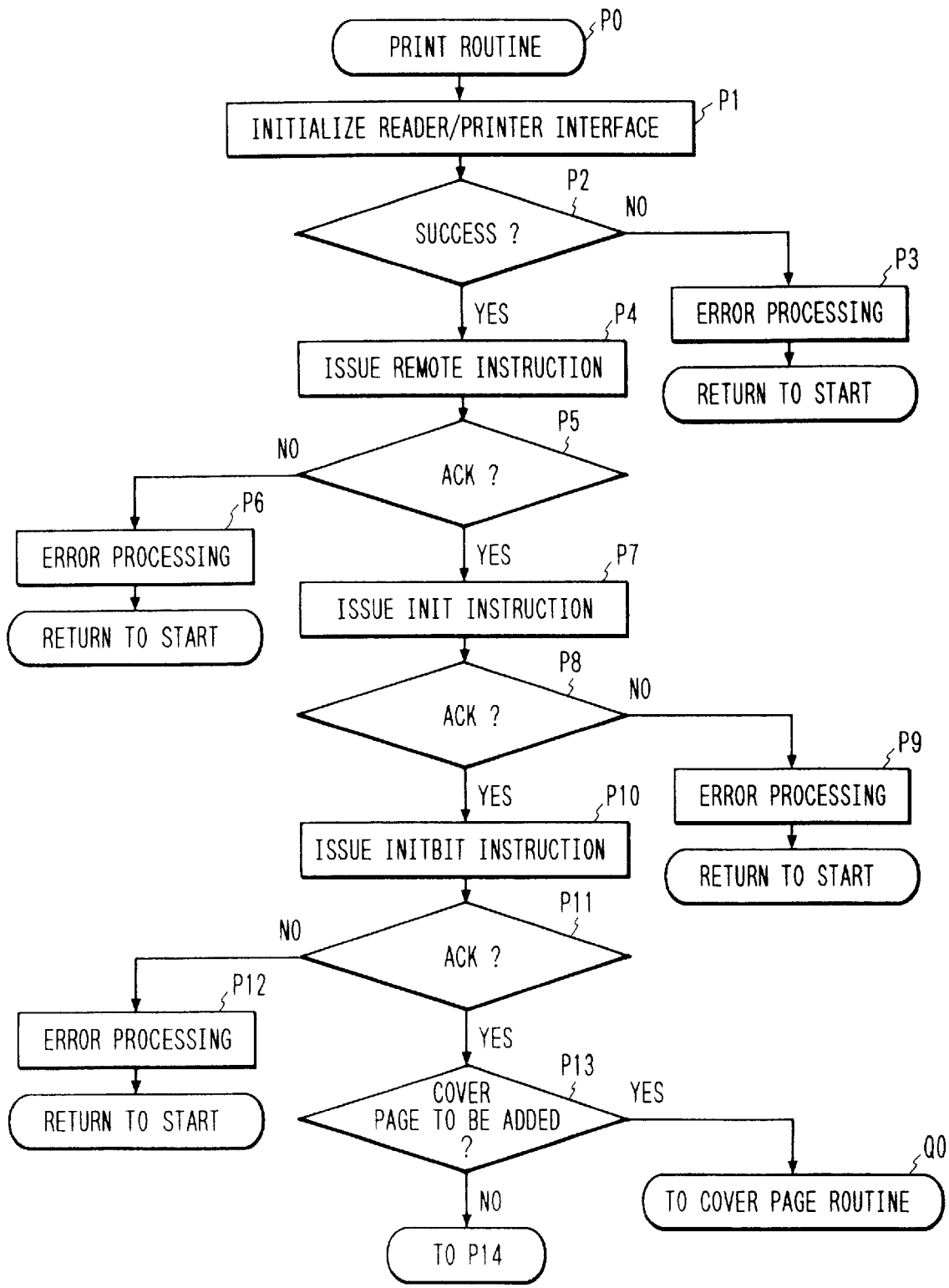
FIG. 13 is a flow chart showing a print routine.
Figure 14:
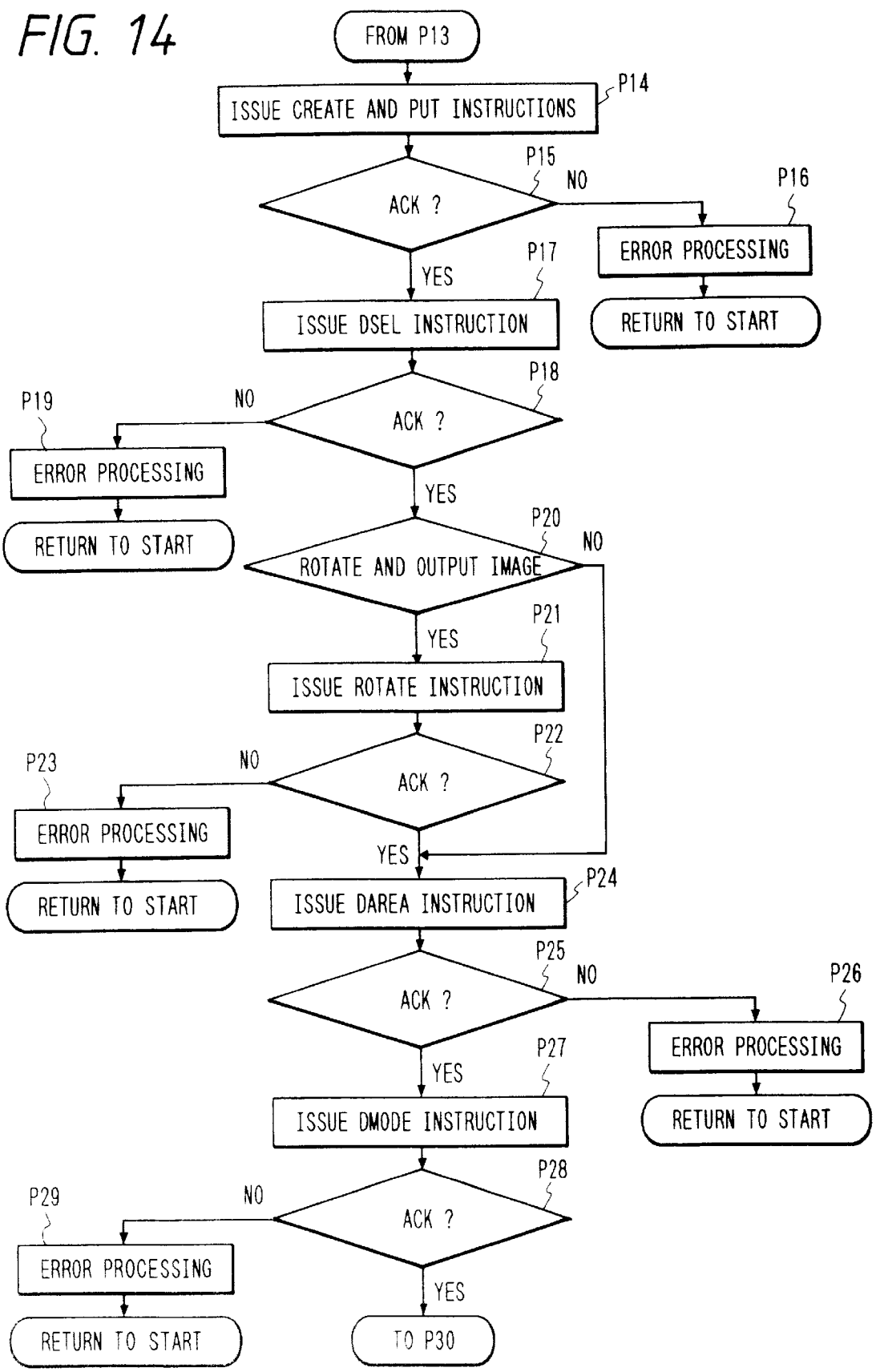
FIG. 14 is a flow chart showing the print routine.
Figure 15:
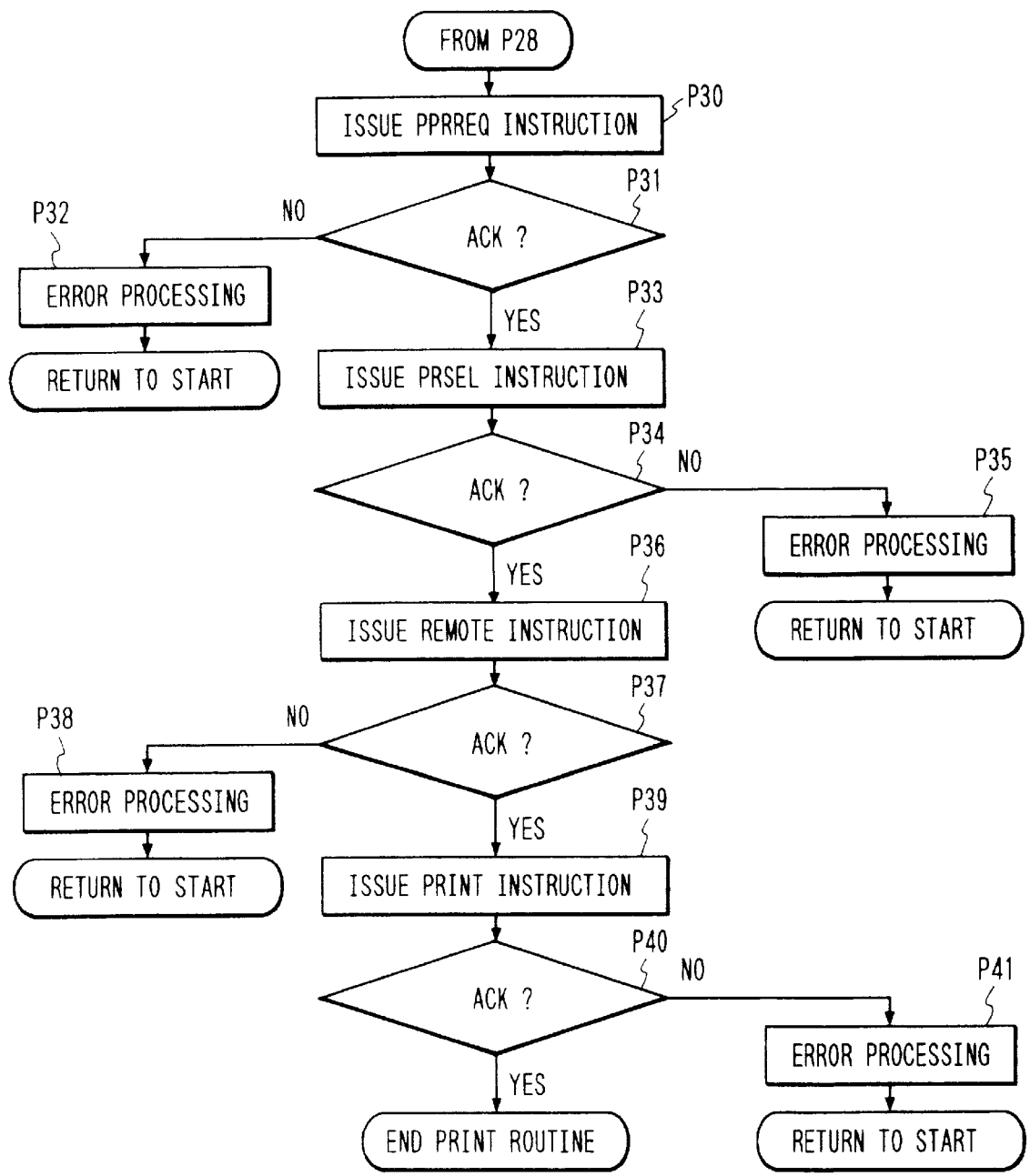
FIG. 15 is a flow chart showing the print routine.

When the "receiving into memory" mode is selected, the CCU 30 receives divided image data transmitted from the transmission circuit 80, and stores the received data in the hard disk device 50 in a compressed state. More specifically, if it is determined in step R32 that the "receiving into memory" mode is selected, the flow advances to step R33. On the other hand, if it is determined that the "receiving into memory" mode is not selected, the flow advances to a print routine P0. FIG. 13 is a flow chart showing the print routine. In step P1, the program in the PMEM 23 is operated according to an instruction from the CPU 26 so as to initialize the reader/printer interfaces 21 and 41. In the receiving program, the same processing is performed in step R10. The print routine is also used for outputting data received in the "receiving into memory" mode. On the other hand, data need not always be printed immediately after the end of communication. When data is output immediately after the receiving operation, initialization is executed again in this step.

In step P4, a "REMOTE" instruction is issued. This instruction can operate the reader/printer unit 40 according to only commands from the main body 20. This step is the same as step R13, and the "REMOTE" instruction is issued for the same reason as described above. In step P7, an "INIT" instruction is issued. This instruction is used for initializing the state of the reader/printer unit 40. With this instruction, the IMEM 42 is initialized. In step P10, an "INITBIT" instruction is issued. This instruction initializes the text memory in the IMEM 42. The IMEM 42 of this embodiment can be divided into image and text memories. The image memory is initialized by the "INIT" instruction, and the text memory is initialized by the "INITBIT" instruction. The text memory is a binary memory, and is used for forming a "cover page" when data is output with the "cover page", as will be described later.

When the control normally progresses, it is checked based on the content of the image header in step P13 if the "transmission with cover page" mode is selected in the above-mentioned "transmission conditions". If YES in step P13, the control enters a cover page print routine in step Q0.

Figure 16:
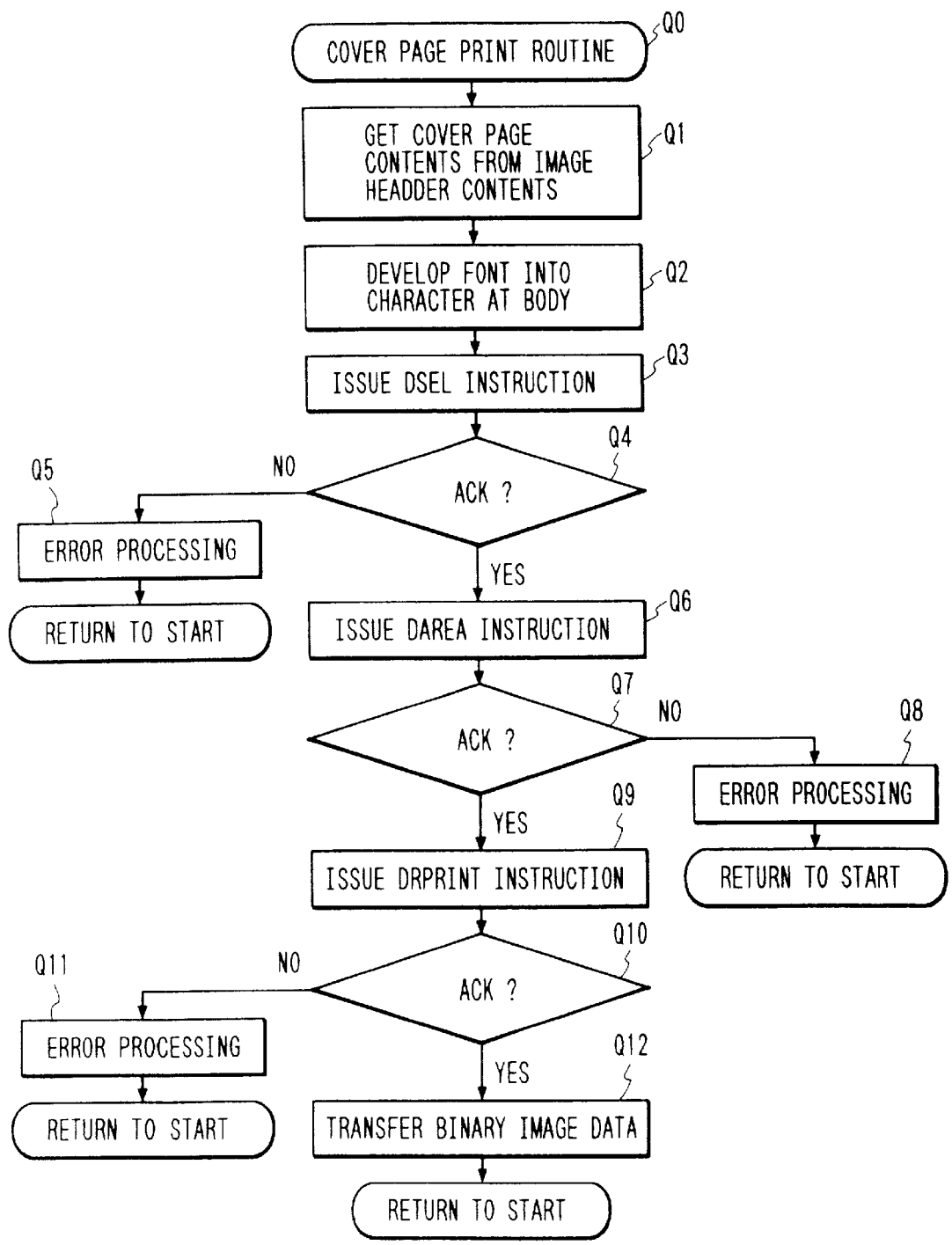
FIG. 16 is a flow chart showing a cover page print routine.
Figure 17:
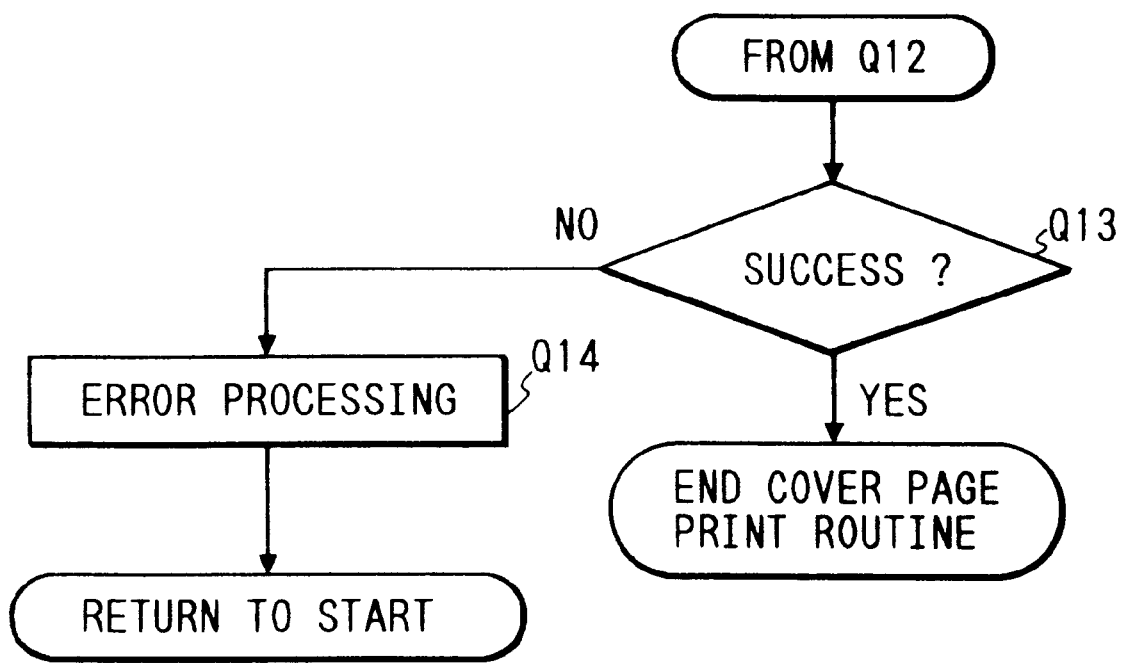
FIG. 17 is a flow chart showing the cover page print routine.

FIG. 16 is a flow chart showing the cover page print routine. In step Q1, pieces of information such as a transmitting user, other party, a date, telephone numbers, and the like are obtained from the image header information. The "cover page" allows a user to confirm information such as transmitting user information, which is normally printed on a portion of a sheet for recording received data, but which is printed on a separate sheet in this case at a glance. In a facsimile apparatus, a cover page is separately created by, e.g., a DTP apparatus, and is transmitted every time data is transmitted. In this system, however, the above-mentioned operation can be automatically performed when the "transmission with cover page" mode is selected.

In step Q2, the content obtained in step Q1 is converted into binary data on a bit map using character fonts in the main body. In this case, if scalable fonts are used, sharp character patterns can be obtained even in an enlarged scale. This bit map is allocated in the IMEM 24. In steps Q3 and Q6, a preparation for transferring the binary data of the "cover page" obtained as described above to the reader/ printer unit is made. In step Q3, a "DSEL" instruction is issued. This instruction is used for causing the reader/printer unit 40 to recognize that the printer 70 is selected as the output apparatus of image data. In step Q6, a "DAREA" instruction is issued. This instruction is used for designating a print position. In step Q9, a "DRPRINT" instruction is issued. This instruction designates a data size, and also designates a data name to be transmitted. In this system, the binary data can be stored in the IMEM 42 in the form of a special file. If it is determined in step Q10 that an ACK signal is sent back in response to the above instruction, the flow advances to step Q12, and the binary "cover page" data is actually transferred from the bit map in the IMEM 24 to the reader/printer unit 40 through the reader/printer interface 21. The transferred data is received by the reader/printer interface 41, and is stored in the text memory of the IMEM 42. Since this system employs the full-color printer, a "BITCOLOR" instruction for coloring the "cover page" data is issued before the "DRPRINT" instruction is issued from the main body, so that colored binary bit map data representing characters can be output. If such a function is provided to the "transmission conditions" at the receiving end, the "cover page" can be colored and output by the above-mentioned means. When the "cover page print routine" is ended, the flow advances to step P14. In step P14, a "CREATE" instruction is issued. This instruction assures an area on the IMEM 42 necessary for synthesizing image data transferred in units of blocks into a sheet of image. Image data in the IMEM 24 is divided, and a "PUT" instruction is issued to the assured area, thereby transferring the divided data to the IMEM 42. When the area can be assured in the IMEM 42, and the IMEM 42 receives the transferred data, the flow advances to step P17. In step P17, a "DSEL" instruction is issued. As described above, this instruction is used for causing the main body to recognize that not a monitor but the printer 70 is selected as the output apparatus. In step P20, it is checked if an image must be rotated and output.

As described above, when the image size at the transmission end does not coincide with the paper cassette size at the receiving end, data is often printed in a reduced scale by the decision at the transmission end. At this time, an image must be rotated through 90° due to the structure of the printer 70. Therefore, in step P20, this decision is made. When an image must be rotated through 90°, the flow advances to step P21 to issue a "ROTATE" instruction. This instruction is used for rotating an image. When an image need not be rotated, the flow advances to step P24 to issue a "DAREA" instruction. Since this subroutine is the print routine, this instruction is used for designating the print position. In step P27, a "DMODE" instruction is issued. This instruction designates the resolution of an image to be output with reference to information in the image header. When an image is output while changing its aspect ratio, the aspect ratio can be changed by this instruction. However, if no designation is made, an image is output without changing the aspect ratio. The flow advances to step P30 to issue a "PPRREQ" instruction. With this command, the mounting positions of the cassettes (upper and lower cassettes) of the printer 70 can be detected. At this time, since a problem about a non-coincidence between paper sizes is already eliminated, a "PRSEL" instruction is issued in step P33 according to the detection result. This instruction determines the upper or lower cassette which supplies output sheets. Therefore, in this system, a proper cassette can be selected regardless of the cassette position and a print-out operation can be performed using the selected cassette, in steps P30 and P33. In step P36, a "REMOTE" instruction is issued again. This instruction sets the printer in the "REMOTE" state during only the print operation after a "PRINT" instruction issued in the next step P39 is ended since the printer 70 requires a long period of time for outputting an image. The main body 20 cancels the lock state of the reader/printer unit 40, and sets it in a local state. In this manner, immediately after the print-out operation, the printer 70 can be used independently of the main body side, and the reader/printer unit 40 can be used as an independent copying machine. In response to the "PRINT" instruction issued in step P39, image data is actually transferred from the IMEM 42 to the printer 70, and is output by the printer 70.

With the above-mentioned print routine, it is checked in step R34 if an output is normal. If YES in step R34, a message indicating that the receiving operation is successful is informed to the transmission end in step R36. Thereafter, the circuit is released in step R37, thus ending the receiving processing.

At this time, a message "receiving is ended" is displayed on the CRT 60.

The "telephone book" routine will be described below. FIG. 18 is a flow chart showing the "telephone book" routine. Note that FIG. 22 shows a "telephone book image". In step B1, it is checked if a new entry is made. If YES in step B1, a name, a telephone number, a sub address, and a flag indicating whether or not a color transmission is performed are input on the "telephone book" image shown in FIG. 22 at the keyboard 61 while observing the CRT 60, in step B2. If it is determined in step B3 that already input "telephone book" data is corrected or deleted, the data is corrected or deleted at the keyboard 61 while observing the CRT 60, in step B4. Upon completion of these processing operations, it is checked in step B5 if display is returned to the previous image, i.e., the main menu. If YES in step B5, the flow returns to "start"; otherwise, the flow returns to step B0 to execute the "telephone book" routine again. In this embodiment, whether or not transmission is performed can also be registered in the telephone book routine. Therefore, the color transmission flag need not be set every time transmission is performed.

Figure 19:
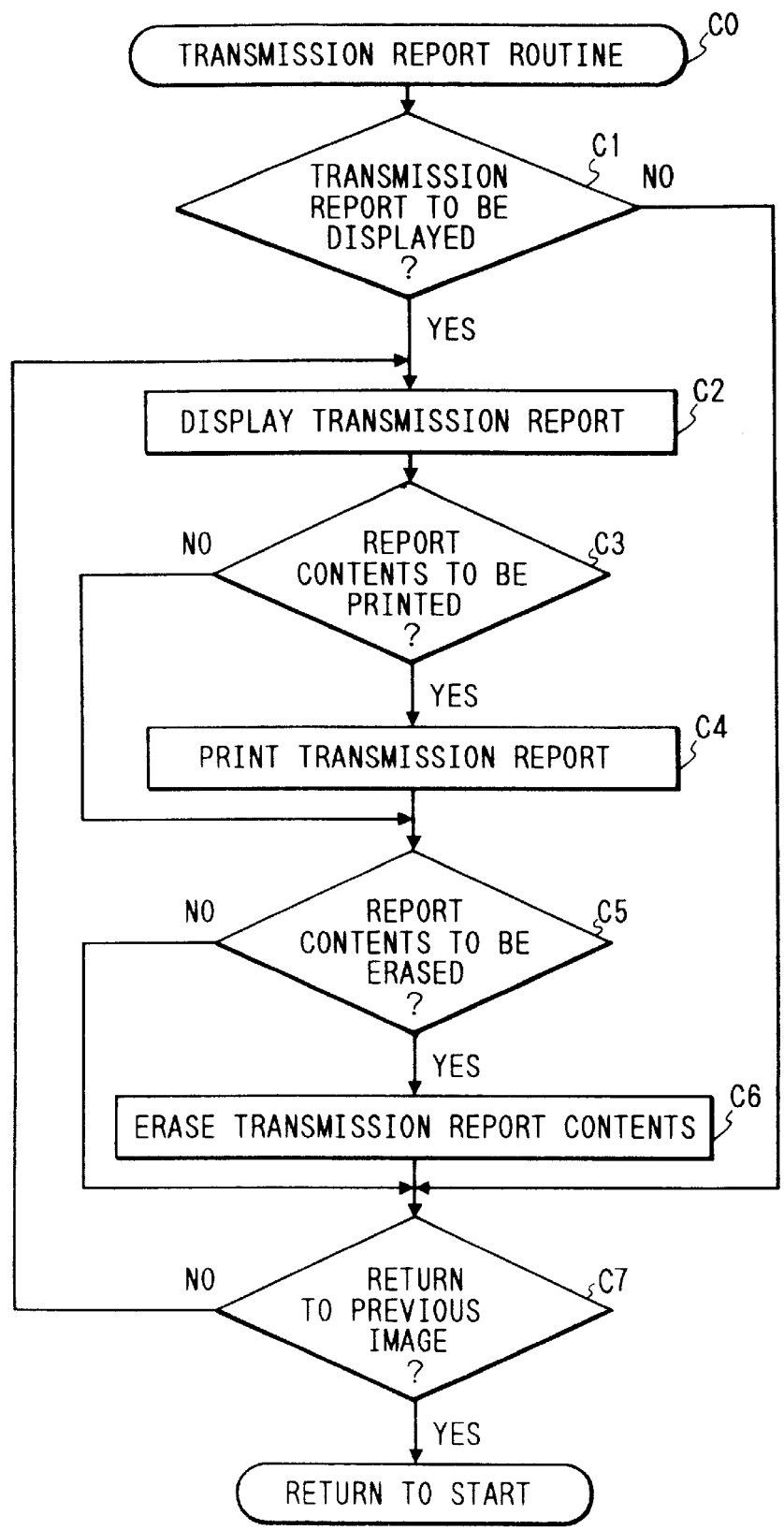
FIG. 19 is a flow chart showing a transmission report routine.

The "transmission report" routine will be described below. FIG. 19 is a flow chart showing the "transmission report" routine.

When data is transmitted or received, the content is stored in the hard disk device 50, and can be displayed on the CRT 60 or printed by the printer 70 as the "transmission report".

FIG. 32 shows a "transmission report" displayed on the CRT 60.

In step C1 in FIG. 19, it is checked if the "transmission report" is displayed on the CRT 60. If YES in step C1, the flow advances to step C2; otherwise, the flow advances to step C7. In step C2, an image shown in FIG. 32 is displayed. In step C3, it is checked if the content of the report is printed. If YES in step C3, the flow advances to step C4. In step C4, the transmission report is printed. In this case, the details of the method are the same as in exchange of commands in the cover page print routine Q0, and a detailed description thereof will be omitted. That is, the only difference is that the content to be printed is a "cover page" or a "report". In step C5, it is checked if the content of the report is erased. If YES in step C5, all the existing data associated with the report are erased in step C6. Upon completion of these processing operations, it is checked in step C7 if display is returned to the previous image, i.e., the main menu. If YES in step C7, the flow returns to "start"; otherwise, the flow returns to step C2.

Figure 20:
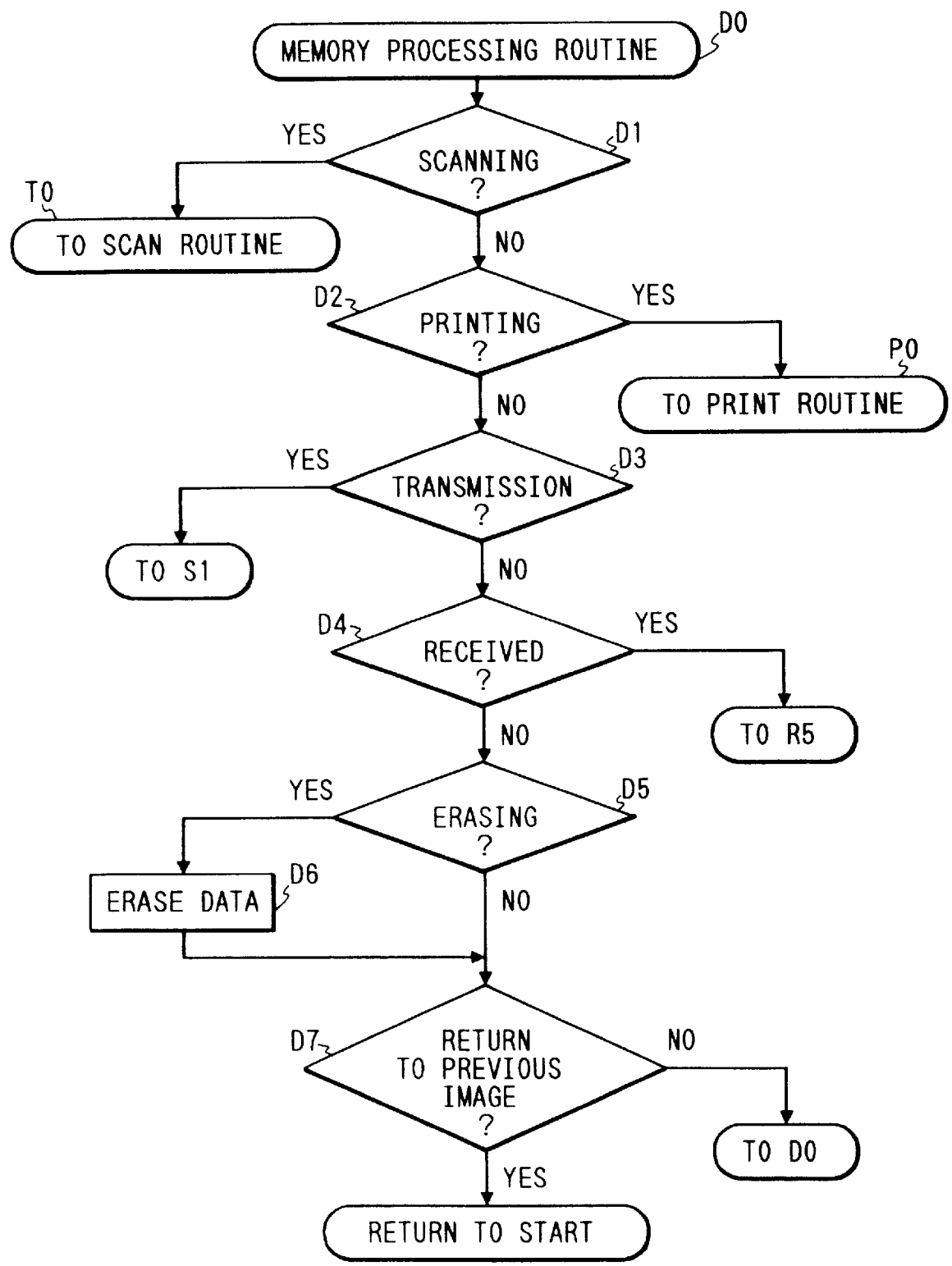
FIG. 20 is a flow chart showing a memory processing routine.

The "memory processing" routine using the hard disk device 50 will be described below. FIG. 20 is a flow chart showing this processing.

In step D1, it is checked if data is input to the hard disk device. When data is input to the hard disk device for the memory transmission mode, the "transmission conditions" such as a telephone number of other party, a resolution and the like are set on the main menu shown in FIG. 21, and thereafter, the control enters the scan routine T0. If it is determined in step D2 that data, which has already been received in the "receiving into memory" mode, and is stored in the hard disk device, is to be output, the control enters the print routine P0. If it is determined in step D3 that the memory transmission operation is performed, the flow jumps to step S1. If it is determined in step D4 that the "receiving into memory" operation is performed, the flow jumps to step R5.

It is checked in step D5 if image data in the hard disk device is erased. If YES in step D5, the data is erased in step D6, and the flow advances to step D7. Upon completion of the above-mentioned processing operations, it is checked in step D7 if display is returned to the previous image, i.e., the main menu. If YES in step D7, the flow returns to "start"; otherwise, the flow returns to step D0.

Figure 36:
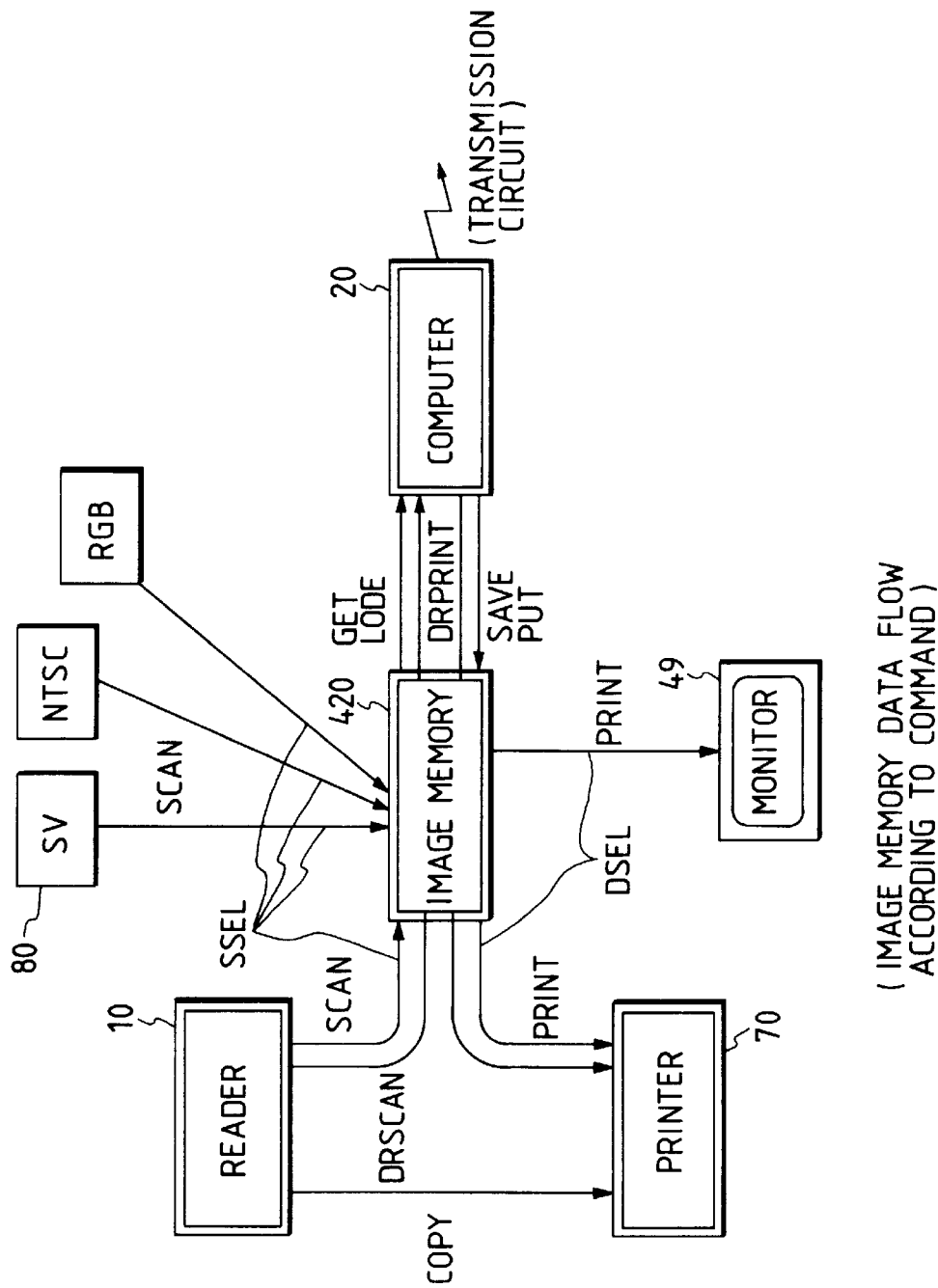
FIG. 36 is a diagram showing the flow of image data according to commands.

FIG. 36 shows the flow of image data according to the commands in the above-mentioned embodiment.

In FIG. 36, the IMEM 42, the CPU 43, the ROM 44, and the reader/printer interface 41 are illustrated as an image memory 420.

The image memory 420 of this embodiment is connected to a monitor 49, the printer 70, the reader 10, the still video recorder 80, and the like.

According to the above-mentioned embodiment, an electronic apparatus comprises the unit 20 shown in FIG. 1, and an image memory comprises the unit 40 shown in FIG. 1.

However, the present invention is not limited to this arrangement. The electronic apparatus may incorporate a display. Alternatively, the display and the VRAM 25 need not be incorporated in the apparatus, and may be independently arranged.

The floppy disk device 51 and the hard disk device 50 may be of either a separate type or a built-in type.

The IMEMs 24 and 42 of this embodiment may comprise semiconductor memories. Alternatively, the IMEMs may comprise other media, e.g., tapes or disks.

The CCU 30 may be incorporated in the electronic apparatus 20 or may be connected as an external unit.

The commands supplied from the electronic apparatus to the image memory in the description of the above embodiment may be changed by rewriting program data in the floppy disk device 51 by a user.

According to the embodiment described above, since commands for operating the reader 10 and the printer 70 as a facsimile apparatus through the image memory 42 are supplied from the electronic apparatus 20, an electronic apparatus and an image processing system, which can improve convenience of use, and have a facsimile function with a simple arrangement, can be provided.

In the above embodiment, since the text and image memories in the IMEM 42 are used, images matching with characteristics of these memories can be stored in the memories.

According to the present invention, an image processing system having a facsimile function, and an electronic apparatus therefor can be readily provided by utilizing a conventional system.

What is claimed is:

1. An electronic apparatus which operates by using program data stored in storing means and which is connected to an integrated type external copying apparatus having both reading means for reading an image and generating image data and image forming means for forming an image on a medium, said electronic apparatus comprising:

output means for outputting a command to the external copying apparatus;

receiving means for receiving image data generated by the reading means according to the command;

transmitting means for transmitting the image data received by said receiving means to an external communication apparatus different from both said electronic apparatus and the external copying apparatus by using a communication network; and control means for controlling said electronic apparatus to display whether said transmitting means transmits the image data as a color transmission or as a monochromatic transmission.

2. An image processing method for an electronic apparatus which operates the electronic apparatus by using program data stored in storing means and which communicates data with an external copying apparatus having both reading means for reading an image and generating image data and image forming means for forming an image on a medium, said method comprising the steps of:

outputting a command to the external copying apparatus;

receiving image data generated by the reading means according to the command;

transmitting the image data received in said receiving step to an external communication apparatus different from both the electronic apparatus and the external copying apparatus by using a communication network; and controlling the electronic apparatus to display whether said transmitting step transmits the image data as a color transmission or as a monochromatic transmission.

3. A copying apparatus having both reading means and image forming means which is connected to an external device, the external device having transmitting means for transmitting image data to an external communication apparatus different from both said copying apparatus and the external device by using a communication network, the external device further having operating means for operating using program data stored by storing means, display means for displaying whether the transmitting means transmits the image data as a color transmission or as a monochromatic transmission, and output means for outputting a command for remote operation, comprising:

receiving means for receiving the command from the external device, said reading means reading an image and generating image data in accordance with the command received from the external device; and sending means for sending the image data generated by said reading means to the external device in order that said transmitting means may transmit that image data to the external communication apparatus.

4. An image processing method for an integrated type copying apparatus having both reading means and image forming means, said method communicating data with an external device that operates by using program data stored in storing means, the external device having transmitting means for transmitting image data to an external communication apparatus different from both the copying apparatus and the external device by using a communication network, display means for displaying whether the transmitting means transmits the image data as a color transmission or as a monochromatic transmission, and output means for outputting a command for remote operation, said method comprising the steps of:

received the command from the external device;

reading an image and generating image data in response to the command received from the external device; and sending the image data generated in said reading step to the external device in order that the transmitting means may transmit the image data to the external communication apparatus.

5. An electronic apparatus which operates by using program data stored in storing means and which is connected to an external copying apparatus having reading means for reading an image and image forming means for forming an image on a medium, said electronic apparatus comprising:

output means for outputting a command to the external copying apparatus;

receiving means for receiving image data generated by the reading means according to the command;

compressing means for compressing the image data received by said receiving means to provide compressed image data;

transmitting means for transmitting the compressed image data to an external communication apparatus different from both said electronic apparatus and the external copying apparatus through a communication network; and controlling means for controlling said electronic apparatus to display on a predetermined display whether said transmitting means transmits the compressed image data as a color transmission or as a monochromatic transmission.

6. An apparatus according to claim 5, further comprising a second controlling means for remotely controlling the copying apparatus.

7. An apparatus according to claim 6, further comprising switch means for switching between a remote operation through said second controlling means and a manual operation of the copying apparatus.

8. An image processing method for an electronic apparatus which is capable of operating the electronic apparatus by using program data stored in storing means and which communicates data with an external copying apparatus having reading means for reading an image and image forming means for forming an image on a medium, said method comprising the steps of:

outputting a command to the external copying apparatus;

receiving image data generated by the reading means according to the command;

compressing the image data received in said receiving step to provide compressed image data;

transmitting the compressed image data through a communication network to an external communication apparatus different from both the electronic apparatus and the external copying apparatus; and controlling the electronic apparatus to display on a predetermined display whether said transmitting means transmits the compressed image data as a color transmission or as a monochromatic transmission.

9. A copying apparatus, including image forming means, which is connected to an external device, the external device having compressing means for compressing image data and operating by using program data stored in storing means, the external device further having transmitting means for transmitting image data through a communication network to an external communication apparatus different from both said copying apparatus and the external device, a display for displaying whether the transmitting means transmits image data as a color transmission or as a monochromatic transmission, and output means for outputting a command for remote operation, said copying apparatus comprising:

receiving means for receiving the command from the external device;

reading means for reading an image and generating image data in accordance with the command received from the external device; and sending means for sending the image data generated by said reading means to the external device in order that the compressing means may compress the image data to provide compressed image data and in order that the transmitting means may transmit the compressed image data to the external communication apparatus while the display displays whether the compressed image data is transmitted as a color transmission or a monochromatic transmission.

10. An image processing method for a copying apparatus having reading means and image forming means which communicates data with an external device, the external device having compressing means for compressing image data to provide compressed image data and operating by using program data stored in storing means, transmitting means for transmitting the compressed image data to an external communication apparatus different from both the copying apparatus and the external device, a display for displaying whether the transmitting means transmits the compressed image data as a color transmission or as a monochromatic transmission, and output means for outputting a command for remote operation, said method comprising the steps of:

receiving the command from the external device;

reading an image and generating image data in accordance with the command received from the external device; and sending means for sending the image data generated in said reading step to the external device in order that the compressing means may compress the image data to provide compressed image data and in order that the transmitting means may transmit the compressed image data to the external communication apparatus while the display displays whether the compressed image data is transmitted as a color transmission or a monochromatic transmission.

11. An electronic apparatus which operates by using program data stored in storing means, said electronic apparatus being connected to an integrated type external copying apparatus having both reading means for reading an image and image forming means for forming an image on a medium, said electronic apparatus comprising:

setting means for setting, through a remote operation, selectively a first mode of using the external copying apparatus as a part of an image transmitting apparatus, or a second mode of using the external copying apparatus as a copier;

transmitting means for receiving image data generated by the reading means during the first mode and transmitting the image data through a communication network to an external communication apparatus different from both said electronic apparatus and the external copying apparatus; and control means for controlling said electronic apparatus to display whether said transmitting means transmits the image data as a color transmission or as a monochromatic transmission is set.

12. An image processing method for an electronic apparatus which operates by using program data stored in storing means, said electronic apparatus being connected to an integrated type external copying apparatus having both reading means for reading an image and image forming means for forming an image on a medium, said image processing method comprising:

a setting step of setting, through a remote operation, selectively a first mode of using the external copying apparatus as a part of an image transmitting apparatus, or a second mode of using the external copying apparatus as a copier;

a transmitting step of receiving image data generated by the reading means during the first mode and of transmitting the image data through a communication network to an external communication apparatus different from both said electronic apparatus and the external copying apparatus; and a control step of controlling said electronic apparatus to display whether said transmitting means transmits the image data as a color transmission or as a monochromatic transmission.

13. A copying apparatus, having both reading means and image forming means, which is connected to an external device, the external device having transmitting means for transmitting image data to an external communication apparatus different from both said copying apparatus and the external device by using a communication network and operating by using program data stored by storing means, and display means for displaying whether the transmitting means transmits the image data as a color transmission or as a monochromatic transmission, said copying apparatus comprising:

switching means for switching, in accordance with a remote operation by the external device, between a first mode of operating said copying apparatus as a part of an image transmitting apparatus, and a second mode of operating said copying apparatus as a copier alone, said reading means during the first mode generating image data by reading an image; and sending means for sending to the external device the image data generated by said reading means during the first mode so that the transmitting means transmits the image data to the external communication apparatus.

14. An image processing method for a copying apparatus, having both reading means and image forming means, which is connected to an external device, the external device having transmitting means for transmitting image data to an external communication apparatus different from both said copying apparatus and the external device by using a communication network and operating by using program data stored by storing means, and display means for displaying whether the transmitting means transmits the image data as a color transmission or as a monochromatic transmission, said image processing method comprising:

a switching step of switching, in accordance with a remote operation by the external device, between a first mode of operating said copying apparatus as a part of an image transmitting apparatus, and a second mode of operating said copying apparatus as a copier alone, said reading means during the first mode generating image data by reading an image; and a sending step of sending to the external device the image data generated by said reading means during the first mode so that the transmitting means transmits the image data to the external communication apparatus.

15. A memory medium for storing a program which can be read by an electronic device which is connected to an integrated type external copying apparatus, the copying apparatus having both reading means for reading an image and generating image data and image forming means for forming an image on a medium, the program causing the electronic device to perform a method comprising the steps of:

outputting a command to the copying apparatus;

receiving from the copying apparatus the image data generated from the reading means according to the command;

transmitting the image data received in said receiving step to an external communication apparatus different from both the electronic device and the copying apparatus using a communication network; and displaying on a predetermined display whether said transmitting step transmits the image data as a color transmission or as a monochromatic transmission.

* * * * *

UNITED STATES PATENT AND TRADEMARK OFFICE
CERTIFICATE OF CORRECTION

PATENT NO. : 5,956,466
DATED : September 21, 1999
INVENTOR(S) :

MASANOBU HORIUCHI ET AL.

It is certified that error appears in the above-identified patent and that said Letters Patent is hereby corrected as shown below:

IN THE DRAWINGS:

Sheet 3, FIG. 3, "ENTER" should read --ENTERED--;
    Sheet 5, FIG. 5, "HEADDER" (three occurrences) should read --HEADER--;
    Sheet 6, FIG. 6, "HEADDER" (three occurrences) should read --HEADER--;
    Sheet 10, FIG. 10, "HEADDER" should read --HEADER--; and
    Sheet 11, FIG. 11, "HEADDER" (three occurrences) should read --HEADER--.

COLUMN 1:

Line 23, "as"" should read --in--;
    Line 66, "This application is a continuation of application" should be deleted; and
    Line 67, Line 67 should be deleted.

COLUMN 3:

Line 64, "perpixel" should read --per pixel--.

UNITED STATES PATENT AND TRADEMARK OFFICE
CERTIFICATE OF CORRECTION

PATENT NO. : 5,956,466
DATED : September 21, 1999
INVENTOR(S) :
MASANOBU HORIUCHI ET AL.

It is certified that error appears in the above-identified patent and that said Letters Patent is hereby corrected as shown below:

COLUMN 17:

Line 37, "received" should read --receiving--.

Signed and Sealed this

Third Day of April, 2001

Attest:

NICHOLAS P. GODICI

*Attesting Officer*     *Acting Director of the United States Patent and Trademark Office*